(12) United States Patent
Miyazaki et al.

(10) Patent No.: US 9,689,439 B2
(45) Date of Patent: Jun. 27, 2017

(54) CLUTCH DEVICE HAVING A BACK TORQUE LIMITER

(71) Applicant: HONDA MOTOR CO., LTD., Minato-Ku, Tokyo (JP)

(72) Inventors: Jun Miyazaki, Wako (JP); Hisashi Sakuyama, Asaka (JP); Hideo Senmyo, Wako (JP); Akira Tokito, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/015,524

(22) Filed: Feb. 4, 2016

(65) Prior Publication Data

US 2016/0230815 A1    Aug. 11, 2016

(30) Foreign Application Priority Data

Feb. 9, 2015  (JP) .................................. 2015-023309

(51) Int. Cl.
*F16D 13/56* (2006.01)
*F16D 43/21* (2006.01)
*F16D 43/22* (2006.01)

(52) U.S. Cl.
CPC ............ *F16D 13/56* (2013.01); *F16D 43/216* (2013.01); *F16D 43/22* (2013.01); *F16D 2013/565* (2013.01)

(58) Field of Classification Search
CPC .......... F16D 13/04; F16D 13/54; F16D 13/56; F16D 2013/565; F16D 43/22; F16D 43/216
See application file for complete search history.

(56) References Cited

U.S. PATENT DOCUMENTS

| 8,146,724 B2 | 4/2012 | Miyazaki et al. |
| 9,458,893 B2* | 10/2016 | Sakuyama .............. F16D 13/56 |
| 2015/0001028 A1* | 1/2015 | Yoshimoto .............. F16D 13/52 192/70.23 |
| 2016/0281796 A1* | 9/2016 | Yamada .................. F16D 13/54 |

FOREIGN PATENT DOCUMENTS

| JP | 8-128462 A | * | 5/1996 |
| JP | 2001-050294 A | * | 2/2001 |
| JP | 2009-236307 A |   | 10/2009 |

* cited by examiner

*Primary Examiner* — Richard Lorence
(74) *Attorney, Agent, or Firm* — Carrier Blackman & Associates, P.C.; Joseph P. Carrier; Anne G. Sabourin

(57) ABSTRACT

A clutch device includes a slipper cam mechanism which releases a back torque by moving a clutch center in an axial direction, and a plunger mechanism provided to the clutch center. The plunger mechanism engages with a movement restricting portion until a rotational speed of the clutch center reaches a threshold value thus restricting the movement of the clutch center in the clutch axial direction, and the plunger mechanism is operated by a centrifugal force when the rotational speed of the clutch center exceeds the threshold value such that it disengages from the movement restricting portion.

8 Claims, 13 Drawing Sheets

CLUTCH DEVICE HAVING A BACK TORQUE LIMITER

CROSS-REFERENCE TO RELATED APPLICATIONS

The present invention claims priority under 35 USC 119 based on Japanese patent application No. 2015-023309, filed on Feb. 9, 2015. The entire subject matter of this priority document, including specification claims and drawings thereof, is incorporated by reference herein.

BACKGROUND OF THE INVENTION

1. Field of the Invention

The present invention relates to a clutch device having a cam as a back torque limiter (slipper).

2. Background Art

Conventionally, as a clutch device provided in a torque transmission path between an engine and a wheel, there has been known a clutch device equipped with a cam for a back torque limiter (slipper) (see, JP-A-2009-236307, for example).

Problem to be Solved by the Invention

In a vehicle provided with such a clutch device, at the time of starting the engine by a manual push start operation, there may be a case where a clutch capacity is changed due to the cam for a back torque limiter (slipper) so that starting of the engine by push starting becomes unstable.

SUMMARY OF THE INVENTION

In view of the above, it is an object of the present invention to provide a clutch device for a vehicle which can stably perform starting of an engine by push starting the vehicle even when the clutch device is equipped with a cam for a back torque limiter (slipper).

In order to achieve the above object, the applicant has developed the present invention, which has several advantageous aspects. For ease of understanding, in the following discussion of the aspects reference numbers are provided which correspond to components of a present exemplary embodiment of the invention as disclosed herein. Such reference numbers are not intended to limit, and should not be construed as limiting, the invention in any way.

According to a first aspect of the present invention, there is provided a clutch device (10) disposed in a torque transmission path between an engine (1) and a wheel, the clutch device (10) including: a first clutch member (11) connected to an engine (1) side; a second clutch member (12) connected to a wheel side; a third clutch member (13) supported on the second clutch member (12) in an axially movable and relatively rotatable manner; a first friction plate (14b) supported on the first clutch member (11) in an axially movable and integrally rotatable manner; a second friction plate (14c) supported on the third clutch member (13) in an axially movable and integrally rotatable manner, such that the second friction plate (14c) overlaps with the first friction plate (14b); a pressure receiving plate (12d) mounted on the second clutch member (12) in a state where the pressure receiving plate (12d) opposedly faces one side of an assembled body (14a) formed of the first friction plate (14b) and the second friction plate (14c) in a clutch axial direction; a pressurizing plate (15) provided in a state where the pressurizing plate (15) faces an opposite side of the assembled body (14a) in the clutch axial direction and is movable toward the pressure receiving plate (12d) in the clutch axial direction; a clutch spring (16) which biases the pressurizing plate (15) to a pressure receiving plate (12d) side; a slipper cam mechanism (30) provided between the second clutch member (12) and the third clutch member (13), and being configured such that in a state where a back torque is applied to the third clutch member (13) from the second clutch member (12), the slipper cam mechanism (30) moves the third clutch member (13) along with the pressurizing plate (15) in the clutch axial direction to reduce the back torque transmitted to the first clutch member (11); and a movement restricting mechanism (40) provided to the third clutch member (13) which selectively limits movement of the third clutch member (13) in the clutch axial direction, wherein the movement restricting mechanism moves between movement restricting and non-restricting positions thereof by a centrifugal force generated by rotation of the third clutch member such that the movement restricting mechanism restricts axial movement of the third clutch member until a rotational speed of the third clutch member (13) reaches a threshold value, but does not restrict the axial movement of the third clutch member when the rotational speed of the third clutch member (13) exceeds the threshold value.

According to a second aspect of the present invention, the movement restricting mechanism (40) engages with a movement restricting portion (22) when restricting the axial movement of the third clutch member (13), and does not engage with the movement restricting portion when not restricting the axial movement of the third clutch member.

According to a third aspect of the present invention, the clutch device further includes: a power transmission shaft (4) for supporting the clutch device (10); a lock nut (23) for fixing the second clutch member (12) to the power transmission shaft (4); and a washer member (22) which forms the movement restricting portion (22) arranged between the lock nut (23) and the second clutch member (12), wherein the movement restricting mechanism (40) includes a plunger (42) which is advanceable and retractable between the movement restricting position of the movement restricting mechanism where the plunger (42) overlaps with the washer member (22) as viewed in an axial direction and the movement non-restricting position of the movement restricting mechanism where the plunger (42) does not overlap with the washer member (22) as viewed in an axial direction, and the plunger (42) contacts the washer member (22) in the clutch axial direction when the movement restricting mechanism (42) is in the movement restricting position thereof, thus restricting the movement of the third clutch member (13) in the clutch axial direction.

According to a fourth aspect of the present invention, the third clutch member (13) is movable in the clutch axial direction between a first engaging position where the third clutch member (13) is separated from the pressurizing plate (15) and is brought into contact with the second clutch member (12) and a second engaging position where the third clutch member (13) is separated from the second clutch member (12) and is brought into contact with the pressurizing plate (15) for moving the pressurizing plate (15) toward a side opposite to the pressure receiving plate (12d), and a sub-spring (27) is provided between the second clutch member (12) and the third clutch member (13), the sub-spring (27) has a smaller spring load than that of the clutch spring (16) and biases the third clutch member (13) to the second clutch member (12) in a direction toward the second engaging position of the third clutch member, and the sub-spring (27) is arranged at a position where the sub-spring (27) overlaps with the plunger (42) as viewed in the clutch axial direction.

According to a fifth aspect of the present invention, the washer member (22) has a washer-side contact surface (46) which is inclined such that the closer to an outer peripheral side the washer-side contact surface (46) is disposed with respect to an axially orthogonal plane, the farther away from an axial center of the plunger (42) the washer-side contact surface (46) is positioned, and the plunger (42) has a plunger-side contact surface (45) which is inclined so as to conform to the washer-side contact surface (46).

According to a sixth aspect of the present invention, the washer-side contact surface (46) and the plunger-side contact surface (45) are each formed into a stepped shape.

According to a seventh aspect of the present invention, the washer-side contact surface (46) and the plunger-side contact surface (45) each have a curved surface portion (45b, 46b) on at least one of a crest portion and a valley portion which form a stepped shape thereof, respectively.

According to an eighth aspect of the present invention, a formed width (H1) of the plunger-side contact surface (45) in an advanceable and retractable direction of the plunger is set larger than a formed width (H2) of the washer-side contact surface (46) in a clutch radial direction.

According to an ninth aspect of the present invention, the washer-side contact surface (46) is formed as an arcuate streak extending along a circumferential direction of the washer member (22), and the plunger-side contact surface (45) is formed as a straight-line shaped streak orthogonal to an axial direction of the plunger (42).

Advantages of the Invention

According to the first aspect of the present invention, even when the clutch device is equipped with a back torque limiter formed of a slipper cam mechanism and the engine is to be started by driving a wheel side by push starting or by an external engine starter or the like, the reduction of a back torque due to the slipper cam mechanism is restricted and hence, the engine can be started in a stable manner.

Also, according to the first and second aspect of the present invention, the movement restricting mechanism can be easily constructed such that it is automatically moved between the movement restricting and movement non-restricting positions thereof by centrifugal force generated by rotation of the third clutch member.

According to the third aspect of the present invention, the movement of the third clutch member can be easily restricted by making use of the washer member of the lock nut associated with the second clutch member as the engaging portion (movement restricting portion) of the movement restricting mechanism.

According to the fourth aspect of the present invention, a spring load of the clutch spring which biases the pressurizing plate in a direction toward a pressure receiving plate side, that is, in a clutch engaging direction, and a spring load of the sub-spring which biases the pressurizing plate in a direction toward a side opposite to the pressure receiving plate, that is, in the clutch disengaging direction, are inputted into the pressurizing plate and hence, the pressurizing plate is biased in a clutch engaging direction with a differential load between the spring loads of both springs. Accordingly, when the pressurizing plate is moved in the clutch disengaging direction by a clutch operator, the pressurizing plate can be moved with an operating force corresponding to a spring load which is the differential load smaller than a spring load of the clutch spring and hence, a clutch disengaging operation can be performed smoothly. Further, the sub-spring is arranged at the position where the sub-spring overlaps with the plunger as viewed in the clutch axial direction and hence, the plunger and the washer member can be maintained in a favorable contact state by also making use of a spring load of the sub-spring.

According to the fifth aspect of the present invention, the plunger can be easily inserted at the position where the plunger engages with the washer member. Accordingly, even when the friction plate wears to some extent, the washer-side contact surface and the plunger-side contact surface can be brought into favorable contact with each other and hence, the engine can be push started or the like in a stable manner.

According to the sixth aspect of the present invention, compared to a case where flat smooth inclined surfaces are brought into contact with each other, the axially orthogonal planes associated with the plunger-side and washer-side contact surfaces can be made to partially abut each other and hence, the movement of the third clutch member in the axial direction can be favorably restricted by suppressing a slip between both contact surfaces and hence, an engine can be started in a stable manner.

According to the seventh aspect of the present invention, even when the plunger advances or retracts in a state where the washer-side contact surface and the plunger-side contact surface are brought into contact with each other, the plunger can smoothly advance or retract following a centrifugal force due to the curved surface portion. Accordingly, an engine can be started in a stable manner.

According to the eighth aspect of the present invention, the clutch device can be made compact compared to the case where an advancing or retracting stroke of the plunger in a state where the washer-side contact surface and the plunger-side contact surface are brought into contact with each other is made to be large, a range where the third clutch member is gradually moved in the clutch axial direction is widened, and a diameter of the whole washer is set to be large thus increasing a formed width of the washer-side contact surface.

According to the ninth aspect of the present invention, work for forming the washer-side contact surface and the plunger-side contact surface into a stepped shape can be performed easily. Also in the case where the stepped portion of the straight line streak on the plunger-side contact surface moves on or off of the stepped portion of the arcuate streak on the washer-side contact surface, the arcuate streak on the plunger-side contact surface moves on or off of the arcuate streak on the washer-side contact surface while being partially brought into contact with the arcuate streak on the washer-side contact surface and hence, the plunger can smoothly advance or retract whereby the engine can be started in a stable manner.

For a more complete understanding of the present invention, the reader is referred to the following, non-limiting, detailed description section, which describes an exemplary embodiment of the present invention and should be read in conjunction with the accompanying drawings. Such exemplary embodiment is provided for illustration and better understanding of the present invention and is not intended to limit the invention in any way. Throughout the detailed description and in the drawings, like numbers refer to like parts.

DETAILED DESCRIPTION OF EXEMPLARY EMBODIMENT OF INVENTION

Figure 1:
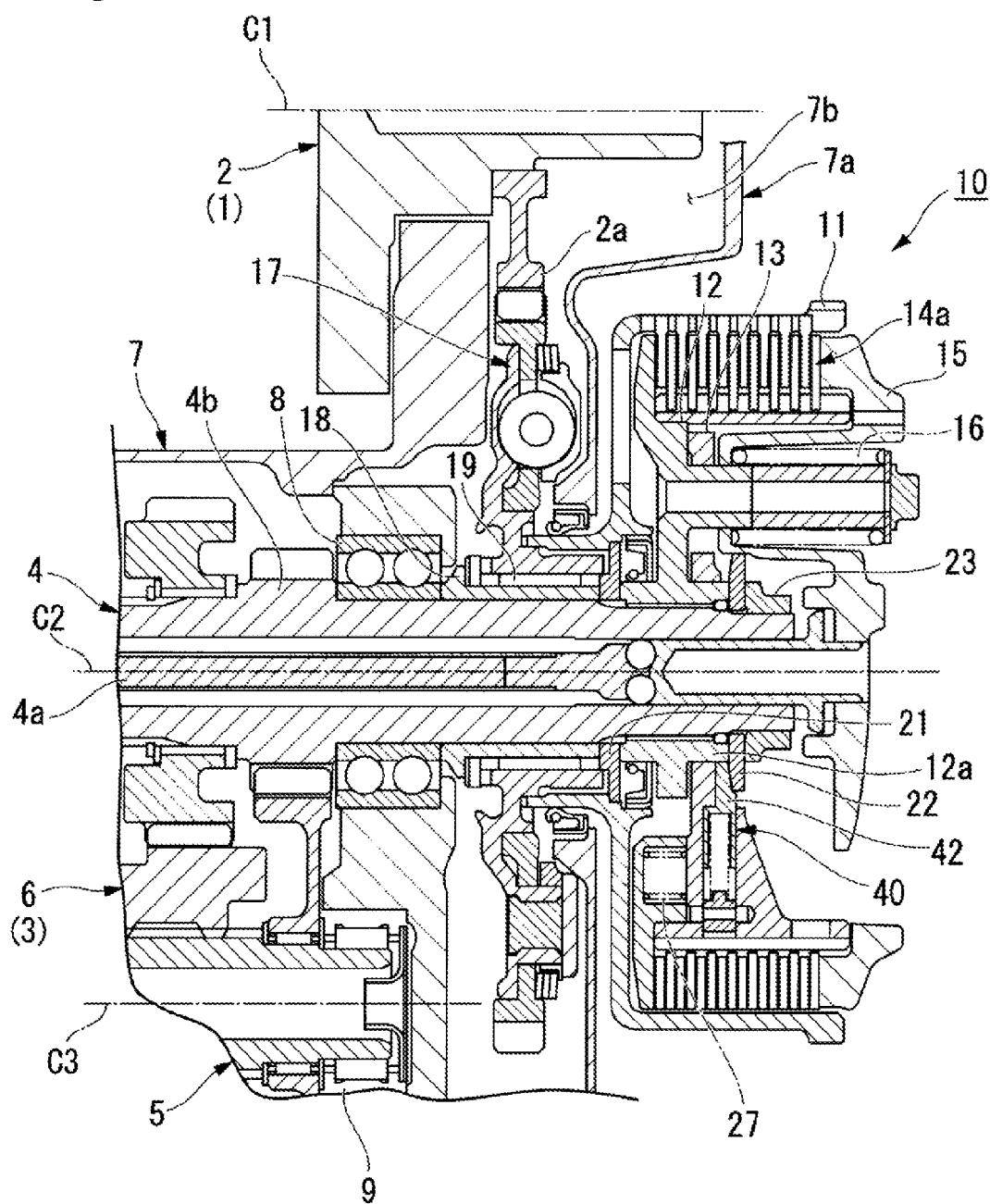
FIG. 1 is a cross-sectional view of an engine and a clutch device according to a present exemplary embodiment of the invention taken along an axial direction of the engine and the clutch device.

As shown in FIG. 1, a clutch device 10 of this embodiment is arranged between a crankshaft 2 of an engine 1 of a vehicle such as a motorcycle, for example, and a transmission 3 disposed more on a drive wheel side than the engine 1. The clutch device 10 engages and disengages power transmission (torque transmission) between the crankshaft 2 and the transmission 3.

A transmission case which houses the transmission 3 therein is contiguously connected to a crankcase 7 which houses the crankshaft 2 of the engine 1 therein. In the transmission 3, a transmission gear group 6 is mounted on a main shaft 4 and a counter shaft 5 arranged parallel to the crankshaft 2. In the drawing, symbols C1, C2, C3 indicate a center axis of rotation of the crankshaft 2, a center axis of rotation of the main shaft 4 and a center axis of rotation of the counter shaft 5 respectively.

Figure 2:
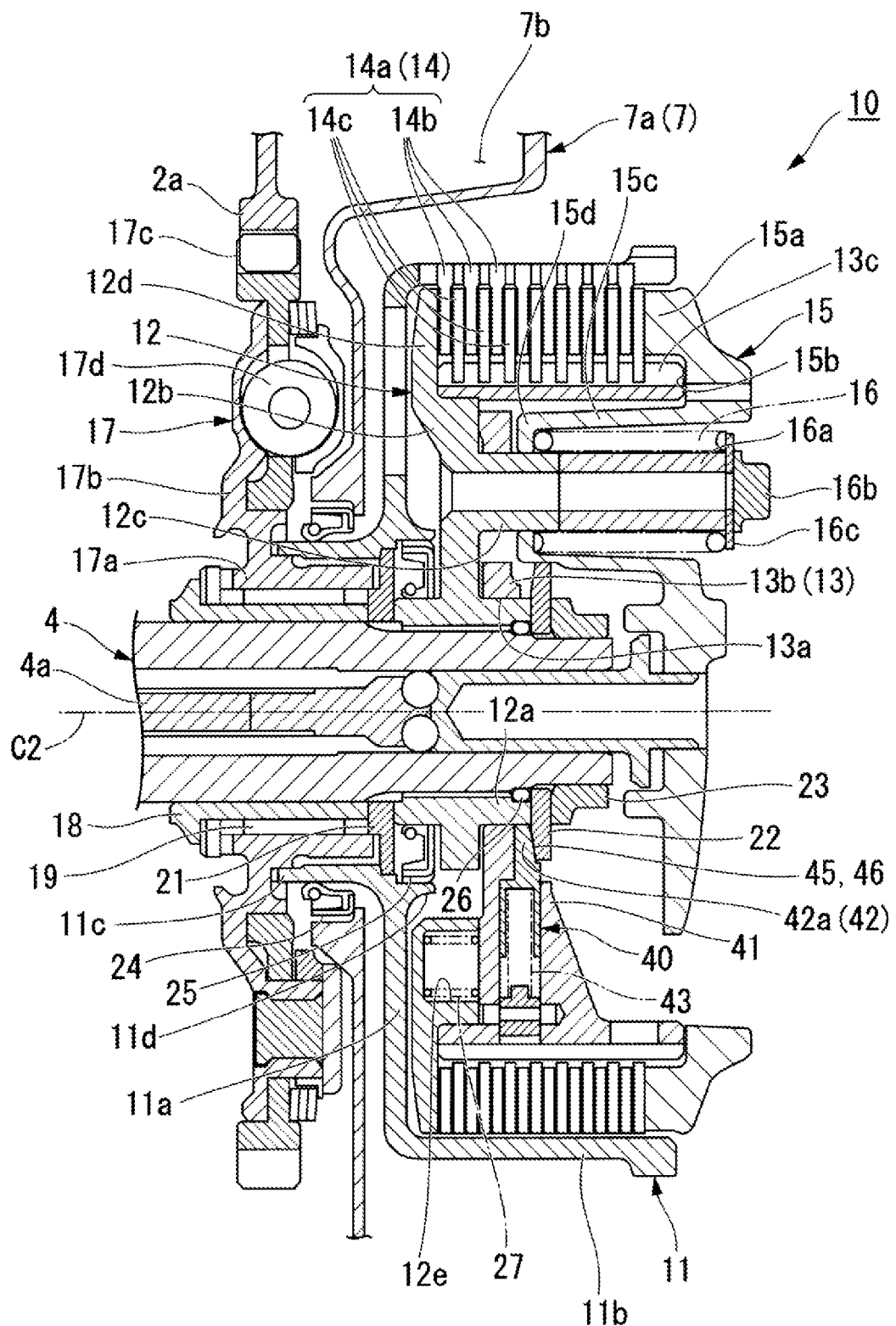
FIG. 2 is a cross-sectional view of the clutch device of FIG. 1 taken along the axial direction of the clutch device in a state where a plunger body is advanced.

Referring also to FIG. 2, the clutch device 10 is a multi-plate clutch which includes a plurality of clutch plates 14. The clutch device 10 is coaxially arranged on one end portion of the main shaft 4 in the axial direction of the shaft. The clutch device 10 engages and disengages the torque transmission between the crankshaft 2 and the main shaft 4. The clutch device 10 is arranged outside a crankcase cover 7a which forms one end side of the crankcase 7 in the axial direction of the respective shafts 2, 4, 5. A space formed in the crankcase cover 7a is used as an oil chamber 7b of the crankcase 7. That is, the clutch device 10 is a dry clutch where the clutch device 10 is arranged outside the oil chamber 7b of the crankcase 7.

In FIG. 1, numeral 8 indicates a ball bearing of plural rows which supports an intermediate portion of the main shaft 4 in the axial direction on a bearing portion of the crankcase 7. Numeral 9 indicates a roller bearing used for supporting a right end portion of the counter shaft 5 on a bearing portion of the crankcase 7.

Hereinafter, the explanation is made assuming the axial direction of the respective shafts 2, 4, 5 as the left-and-right direction, and one end side of the respective shafts 2, 4, 5 in the axial direction as the right side. There may be also a case where the axial direction of the clutch device 10 is referred to as "clutch axial direction", the circumferential direction of the clutch device 10 is referred to as "clutch circumferential direction" or "clutch rotational direction", and the radial direction of the clutch device 10 is referred to as "clutch radial direction".

The clutch device 10 disengages the power transmission by operating a clutch operator such as a clutch lever. In the example shown in the drawing, the clutch device 10 disengages the torque transmission by releasing the friction engagement of the clutch plates 14 by moving a pressure plate 15 to the right side in the axial direction by a push rod 4a or the like which is inserted into a main shaft 4.

Figure 4:
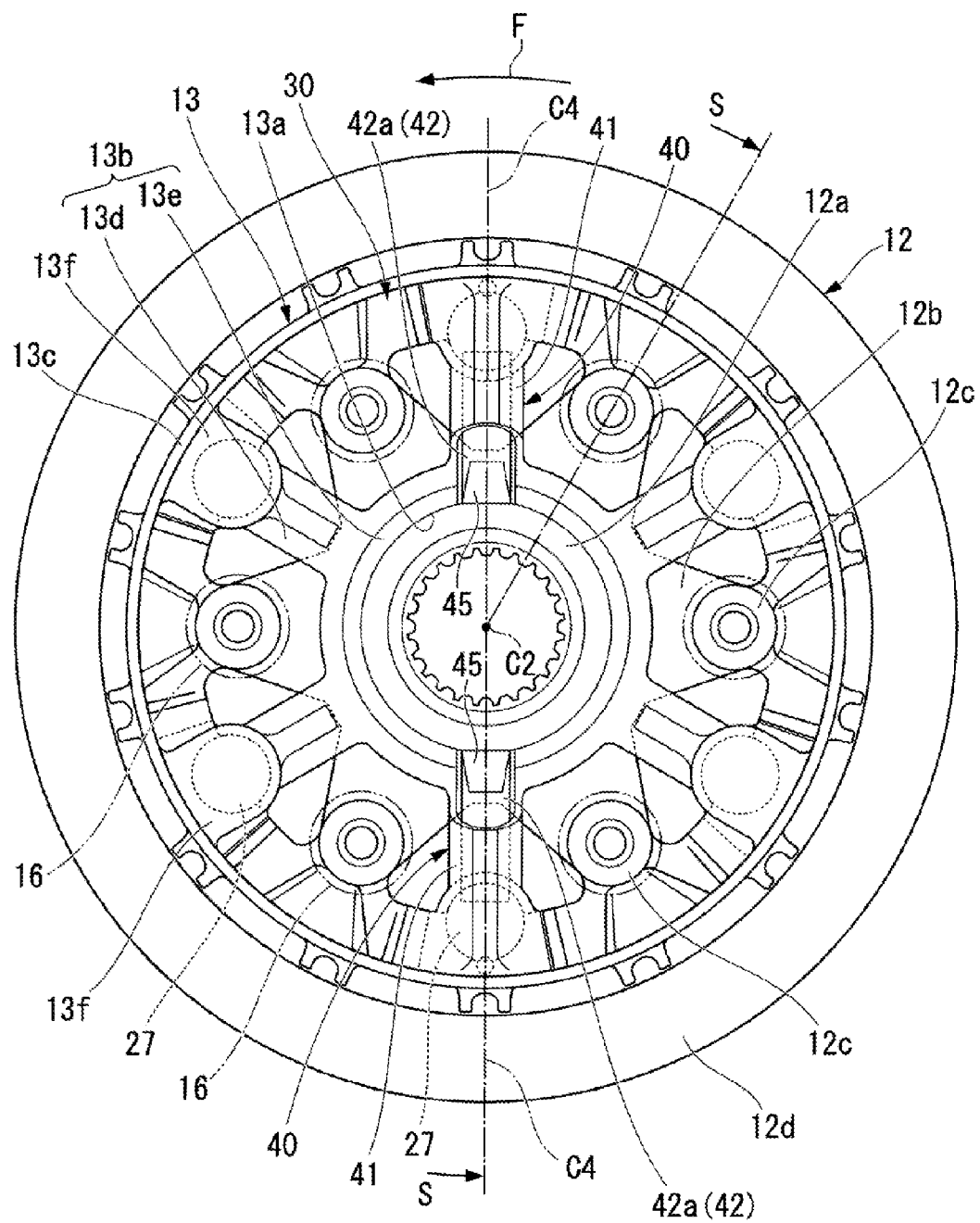
FIG. 4 is a side view of the clutch device of FIG. 1 in a state where a clutch inner and a clutch center are assembled to each other as viewed in a clutch axial direction.

The clutch device 10 includes: a clutch outer 11 which has a bottomed cylindrical shape coaxial with the main shaft 4, and is supported on the main shaft 4 in a relatively rotatable manner; a clutch inner 12 which is coaxially arranged on an inner peripheral side of the clutch outer 11, and is supported on the main shaft 4 in an integrally rotatable manner; a clutch center 13 which is coaxially arranged on an inner peripheral side of the clutch inner 12, and is supported on the clutch inner 12 in a relatively rotatable manner; the plurality of clutch plates 14 which have an annular shape coaxial with the clutch outer 11 and the clutch center 13, and are stacked on each other in the clutch axial direction between the clutch outer 11 and the clutch center 13; a disc-shaped pressure plate 15 which is coaxially arranged on the open side (right side) of the clutch outer 11, and pushes the plurality of clutch plates 14 (hereinafter also referred to as "clutch plate group 14a") to the bottom portion 11a side (left side) of the clutch outer 11; a plurality of clutch springs 16 which biases the pressure plate 15 toward the clutch inner 12 arranged on the bottom portion 11 a side of the clutch outer 11; and a slipper cam mechanism 30 which changes a clutch capacity by moving the clutch center 13 in the axial direction corresponding to the input direction of the transmission torque (see FIG. 4 and the like).

The clutch outer 11 is an integral body formed of a disc-shaped bottom portion 11a and a cylindrical outer peripheral portion 11b which is raised rightward from an outer peripheral edge of the bottom portion 11 a. A plurality of clutch plates of the clutch plate group 14a which are supported on the clutch outer 11 (hereinafter referred to as "clutch discs 14b") are supported on the outer peripheral portion 11b of the clutch outer 11. The plurality of clutch discs 14b are supported on the clutch outer 11 such that the clutch discs 14b are integrally rotatable with the clutch outer 11 and are shiftable in the clutch axial direction.

On the left side of the bottom portion 11a of the clutch outer 11, a primary driven gear 17 is arranged coaxially with the clutch outer 11 with the crankcase cover 7a interposed between the primary driven gear 17 and the bottom portion 11*a* of the clutch outer 11. The primary driven gear 17 includes: a cylindrical hub portion 17*a* which is rotatably supported on an outer periphery of the main shaft 4 with a collar 18 and a needle bearing 19 interposed therebetween; and a flange portion 17*b* which is formed on an outer peripheral side of the hub portion 17*a* in an integrally rotatable manner, and forms gear teeth 17*c* on an outer peripheral portion thereof.

The primary driven gear 17 constantly transmits rotational power to the crankshaft 2 by being meshed with a primary drive gear 2*a* which is coaxially supported on the crankshaft 2 in an integrally rotatable manner. A damper 17*d* which performs buffering in the rotational direction between the hub portion 17*a* side and the gear teeth 17*c* side is mounted on the flange portion 17*b*. A sleeve 11*c* which extends leftward from the center of the bottom portion 11*a* of the clutch outer 11 is arranged on the right outer peripheral side of the hub portion 17*a*. The sleeve 11*c*, eventually a left end portion of the clutch outer 11, is engaged with a right side portion of the flange portion 17*b* of the primary driven gear 17 in an integrally rotatable manner.

Figure 5:
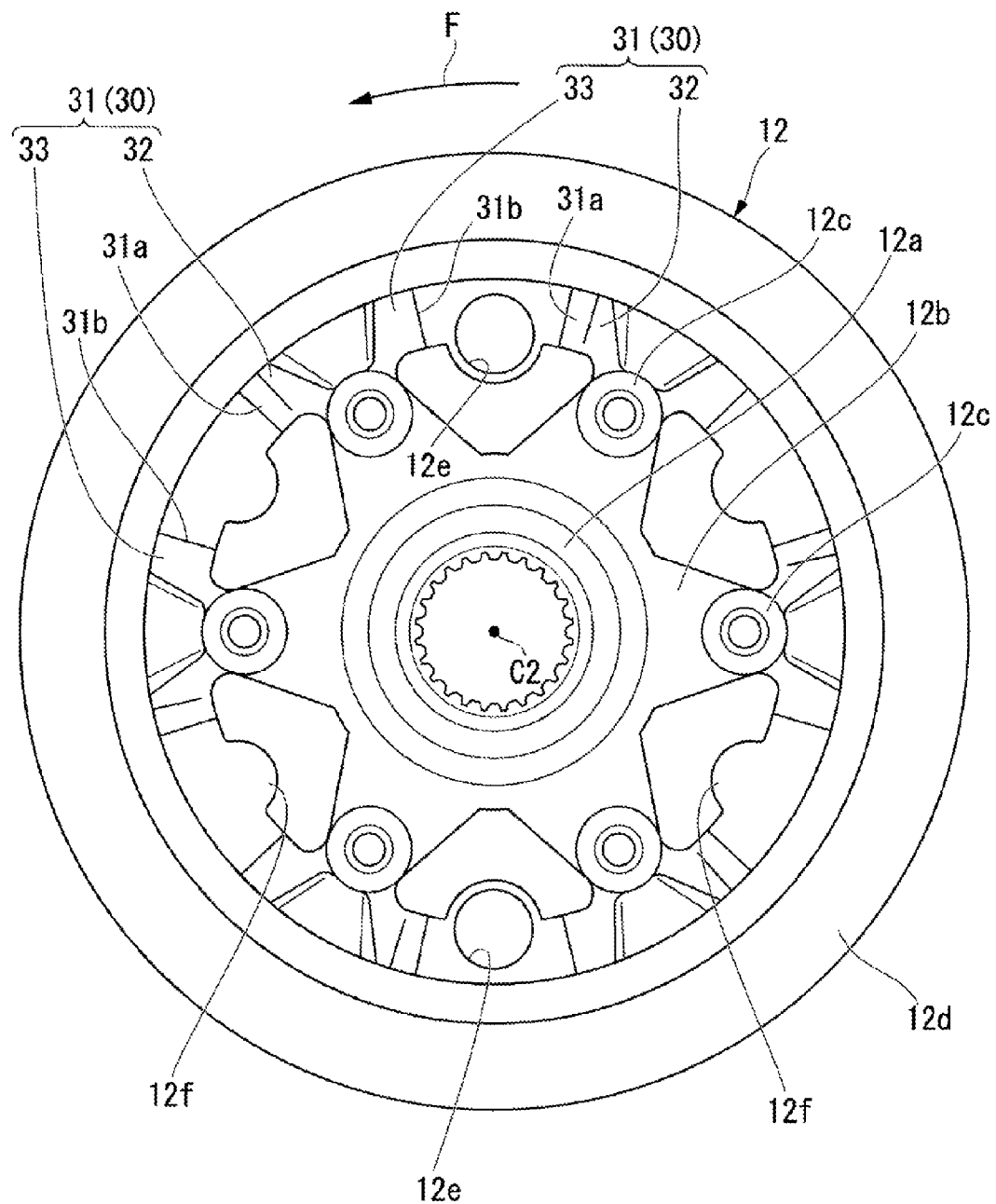
FIG. 5 is a side view of the clutch inner which corresponds to FIG. 4.

Referring to FIG. 2, FIG. 4 and FIG. 5, the clutch inner 12 is an integral body formed of: a hub portion 12*a* which is engaged with the outer periphery of the main shaft 4 by spline fitting; a flange portion 12*b* which is formed on the outer peripheral side of the hub portion 12*a* and extends to an intermediate position of the bottom portion 11*a* of the clutch outer 11 in the radial direction; a plurality of (six) boss portions 12*c* which are formed on a right side of the flange portion 12*b* at an intermediate position in the radial direction, the boss portions 12*c* being raised parallel to the axial direction; and a pressure receiving flange 12*d* which further extends to the outer peripheral side from a left outer peripheral side of the flange portion 12*b*. The plurality of boss portions 12*c* are arranged in an equidistantly spaced manner in the circumferential direction. Openings are formed in the flange portion 12*b* between the boss portions 12*c* arranged in the circumferential direction.

Figure 6:
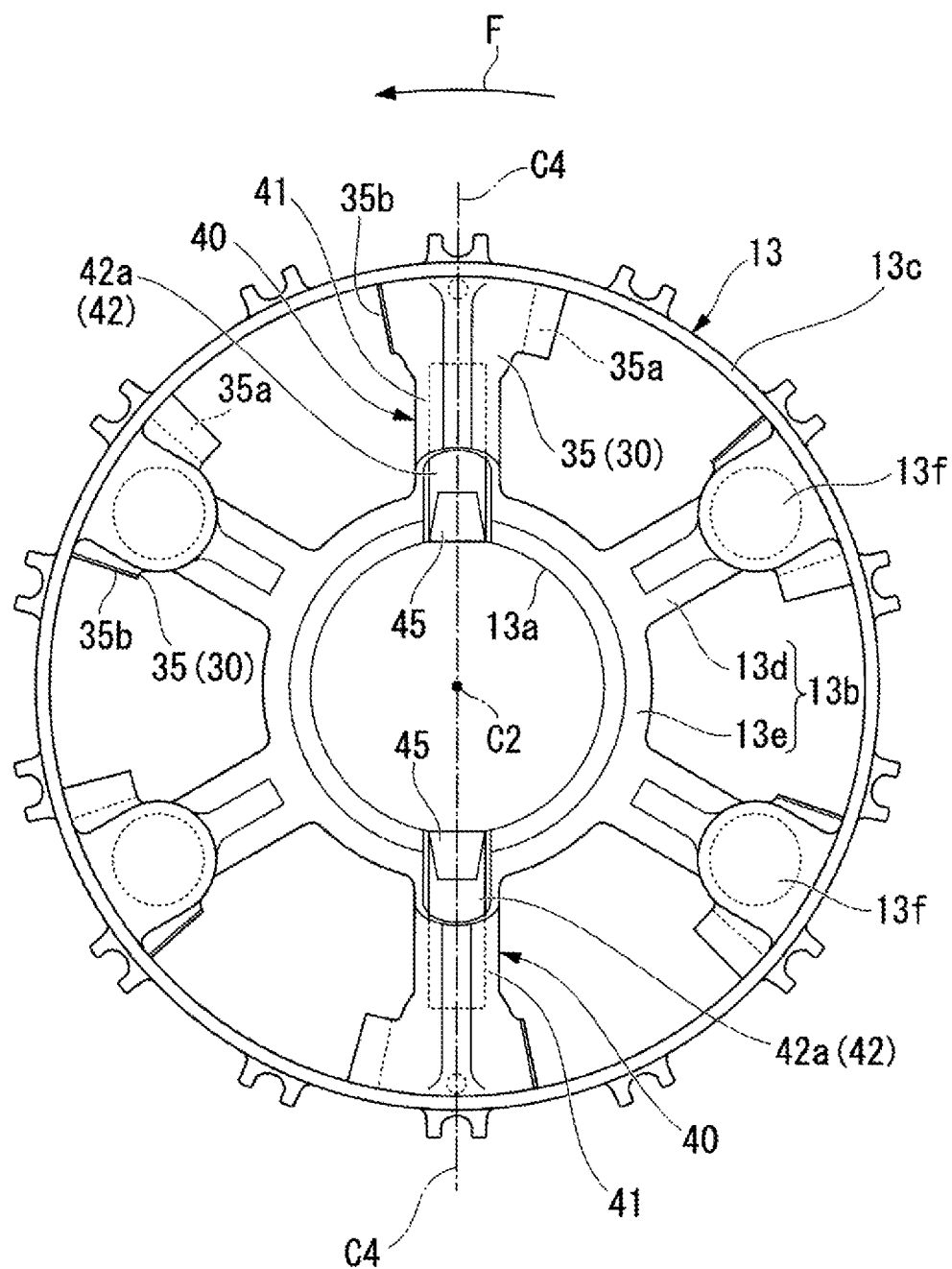
FIG. 6 is a side view of the clutch center which corresponds to FIG. 4.

Referring to FIG. 2, FIG. 4 and FIG. 6, the clutch center 13 is an integral body formed of: a flange portion 13*b* which has a center opening 13*a* in which a right outer periphery of the hub portion 12*a* of the clutch inner 12 is fitted in a relatively rotatable manner, and is adjacently arranged on the right side of the flange portion 12*b*; and an outer peripheral portion 13*c* which is supported on an outer periphery of the flange portion 13*b*. For example, the flange portion 13*b* is formed of: a plurality of (six) spoke portions 13*d* which extend along the radial direction; and an annular portion 13*e* in which the center opening 13*a* is formed. The outer peripheral portion 13*c* is formed into a grid shape having a plurality of openings (see FIG. 8).

A plurality of clutch plates of the clutch plate group 14*a* which are supported on the clutch center 13 (hereinafter referred to as "clutch plates 14*c*") are supported on the outer peripheral portion 13*c* of the clutch center 13. The plurality of clutch plates 14*c* are supported on the clutch center 13 such that the clutch plates 14*c* are integrally rotatable with the clutch center 13, and are shiftable in the clutch axial direction.

The flange portion 13*b* of the clutch center 13 supports the clutch plates 14*c* at a position more on an inner side (right side) than a left end of the outer peripheral portion 13*c* in the axial direction. The left end portion of the outer peripheral portion 13*c* is fitted on the outer periphery of the flange portion 12*b* of the clutch inner 12 in a relatively rotatable manner. An annular space is formed between the outer peripheral portion 13*c* and the outer peripheral portion 11*b* of the clutch outer 11, and the clutch plate group 14*a* is arranged in the space. A line S-S in FIG. 4 corresponds to a cross-sectional line in FIG. 1 to FIG. 3.

Referring to FIG. 2, the respective clutch discs 14*b* and the respective clutch plates 14*c* have a disc shape with a center opening. The clutch plate group 14*a* is formed by alternately stacking in an overlapping manner the clutch discs 14*b* and the clutch plates 14*c* in the clutch axial direction. For example, the clutch disc 14*b* is formed by laminating a friction member on both surfaces of a metal-made base plate by adhesion, and the clutch plate 14*c* is formed of a single metal plate. Further, the clutch plate 14*c* disposed on a right end of the clutch plate group 14*a* may include a wave washer, a disc spring or the like for preventing judder.

A pressing flange 15*a* which is brought into contact with a right side surface of the clutch plate group 14*a* is formed on an outer peripheral portion of the pressure plate 15. The pressure receiving flange 12*d* of the clutch inner 12 is arranged at a position away from the pressing flange 15*a* in the leftward direction. The pressure receiving flange 12*d* and the pressing flange 15*a* oppositely face each other in the clutch axial direction, and the clutch plate group 14*a* is arranged between the pressure receiving flange 12*d* and the pressing flange 15*a*. A lift portion 15*b* which can be brought into contact with a right end of the outer peripheral portion 13*c* of the clutch center 13 is formed on an inner peripheral side of the pressing flange 15*a*.

A plurality of bottomed cylindrical spring housing cup portions 15*c* which open rightward are formed on intermediate portions of the pressure plate 15 in the radial direction. The number and positions of the plurality of spring housing cup portions 15*c* to be disposed are equal to the number and positions of the plurality of boss portions 12*c* of the clutch inner 12. The corresponding boss portions 12*c* are engaged with bottom portions 15*d* of the respective spring housing cup portions 15*c* such that the boss portions 12*c* penetrate the spring housing cup portions 15*c* in an axially movable manner. With such a configuration, the pressure plate 15 becomes rotatable integrally with the clutch inner 12.

A spring receiving washer 16*c* is fastened to each boss portion 12*c* by a bolt 16*b* with a collar 16*a* connected to the right side of the boss portion 12*c* interposed between the boss portion 12*c* and the spring receiving washer 16*c*. The spring receiving washer 16*c*, together with the bottom portion 15*d* of the spring housing cup portion 15*c*, which is away from the spring receiving washer 16*c* in the leftward direction, holds the clutch spring 16 formed of a coil spring, which expands and contracts in the clutch axial direction, in an initial compression state of the spring. With such a configuration, the pressure plate 15 is biased to the clutch inner 12 in the leftward direction (to the clutch inner 12 side) by a compressive load generated by the plurality of clutch springs 16.

The clutch plate group 14*a* is clamped between the pressure receiving flange 12*d* and the pressing flange 15*a* by a pressing force from the pressure plate 15. With such a configuration, the clutch plate group 14*a* is frictionally engaged with the pressure receiving flange 12*d* and the pressing flange 15*a* as an integral body so that the clutch device 10 is brought into a clutch engaged state where the torque transmission can be performed between the clutch outer 11 and the clutch inner 12. On the other hand, when the friction engagement is released, the clutch device 10 is brought into a clutch disengaged state where the torque transmission is disengaged.

An enlarged diameter portion 4b which forms gear teeth of the transmission 3 is formed on a portion on the outer periphery of the main shaft 4 which is adjacently arranged on the left side of the ball bearing 8. A left end of the inner race of the ball bearing 8 is brought into contact with a right end of the enlarged diameter portion 4b, and a left end of the collar 18 is brought into contact with a right end of the inner race. A left end of the hub portion 12a of the clutch inner 12 is brought into contact with a right end of the collar 18 with the washer member 21 interposed therebetween, and a left end of a lock nut 23 is brought into contact with a right end of the hub portion 12a with the washer member 22 interposed therebetween. By fastening the lock nut 23, the inner race of the ball bearing 8, the collar 18, the washer member 21, the hub portion 12a of the clutch inner 12 and the washer member 22 are fixed to the outer periphery of the main shaft 4.

An oil seal 24 is arranged between an outer peripheral surface of the sleeve 11c of the clutch outer 11 and an inner peripheral surface of an opening formed in the crankcase cover 7a. On the right side of the washer member 21, an oil seal 25 is arranged between an inner peripheral surface of an annular projecting portion 11d disposed on the right side of the sleeve 11c of the clutch outer 11 and an outer peripheral surface of a left portion of the hub portion 12a of the clutch inner 12. On the left side of the washer member 22, an O-ring 26 is arranged between an inner peripheral surface of a right portion of the hub portion 12a of the clutch inner 12 and an outer peripheral surface of a right end portion of the main shaft 4. By means of these oil seals 24, 25 and the O-ring 26, leakage of oil through a periphery of the main shaft 4 into the inside of the crankcase 7 can be prevented.

Referring also to FIG. 4, a plurality of (six) sub-springs 27 which bias the clutch center 13 to the clutch inner 12 in the rightward direction are disposed between the flange portion 12b of the clutch inner 12 and the flange portion 13b of the clutch center 13. The plurality of sub-springs 27 are disposed at a position where the sub-springs 27 overlap with the plurality of spoke portions 13d of the flange portion 13b of the clutch center 13 as viewed in the axial direction.

Referring also to FIG. 6, out of six spoke portions 13d of the clutch center 13, a plunger mechanism 40 extending in the radial direction is formed on the pair of spoke portions 13d disposed at positions symmetrical to each other in the radial direction respectively. Out of six spoke portions 13d, a bottomed cylindrical spring receiving cup portion 13f which is opened leftward is formed on each of remaining four spoke portions 13d on which the plunger mechanism 40 is not formed.

Out of six sub-springs 27 each of which is formed of a coil spring which expands and contracts in the clutch axial direction, two sub-springs 27 which overlap with the plunger mechanisms 40 as viewed in the axial direction are disposed in a shrunken state such that a right end of each sub-spring 27 is brought into contact with a left side surface of the plunger mechanism 40, a left side portion of each sub-spring 27 is fitted in a spring receiving recessed portion 12e formed in the flange portion 12b of the clutch inner 12, and a left end of each sub-spring 27 is brought into contact with a bottom surface of the spring receiving recessed portion 12e.

Out of six sub-springs 27, the remaining four sub-springs 27 on which the plunger mechanisms 40 are not formed are disposed in a shrunken state such that a right side portion of each sub-spring 27 is fitted in the spring receiving cup portion 13f formed in the spoke portion 13d of the clutch center 13, a right end of each sub-spring 27 is brought into contact with a bottom surface of the spring receiving cup portion 13f, and a left end of each sub-spring 27 is brought into contact with a right side surface of a spring receiving member 12f formed on the flange portion 12b of the clutch inner 12.

With such a configuration, the two sub-springs 27 which overlap with the plunger mechanisms 40 in the axial direction and the remaining four sub-springs 27 are disposed at positions different from each other in the axial direction.

Referring to FIG. 4, although the plurality of sub-springs 27 are provided, the number of sub-springs 27 is equal to the number of plurality of clutch springs 16. In a state where the clutch inner 12 and the clutch center 13 are assembled to each other, the plurality of sub-springs 27 and the plurality of clutch springs 16 are arranged such that the sub-spring 27 and the clutch spring 16 are alternately arranged in the circumferential direction.

A spring load of the sub-spring 27 is smaller than a spring load of the clutch spring 16 so that a total spring load of the plurality of sub-springs 27 is also smaller than a total spring load of the plurality of clutch springs 16.

Referring also to FIG. 5 to FIG. 8, the slipper cam mechanism 30 includes: a plurality of (six) inner side cams 31 which project in the rightward direction on the outer peripheral side between the plurality of boss portions 12c of the clutch inner 12; and center-side cams 35 which project in the leftward direction on the outer peripheral side of each of the plurality of spoke portions 13d of the clutch center 13. The plurality of inner side cams 31 are arranged in an equidistantly spaced manner in the clutch circumferential direction, and the plurality of center-side cams 35 are arranged in an equidistantly spaced manner in the clutch circumferential direction.

Figure 7:
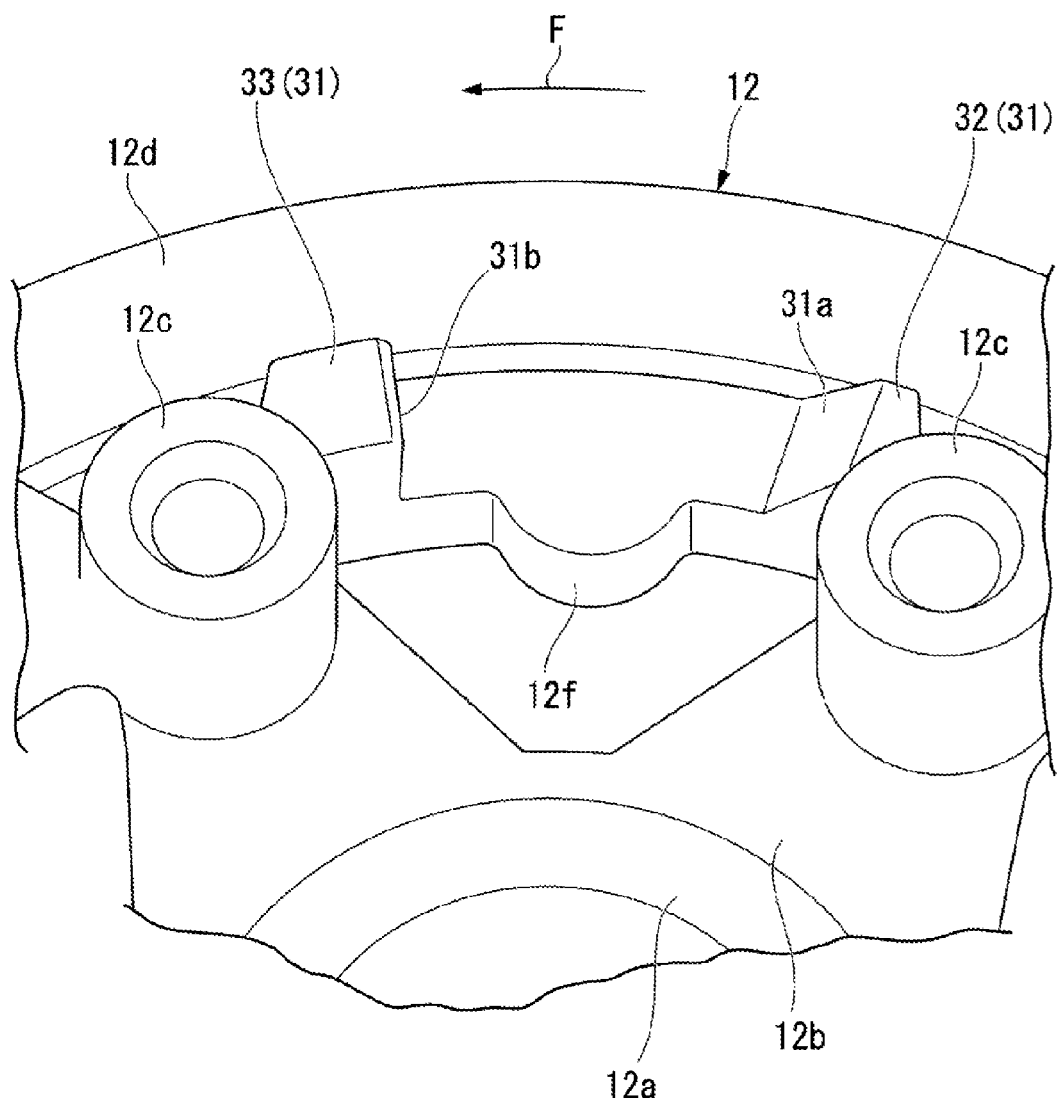
FIG. 7 is an enlarged perspective view of an inner side cam of the clutch inner and an area around the inner side cam of the clutch inner.

Referring to FIG. 5 and FIG. 7, each of the inner side cams 31 includes: an upstream-side cam 32 positioned on the upstream side (on a side opposite to the direction indicated by the arrow F) in the clutch rotational direction (indicated by an arrow F) which follows the clutch circumferential direction; and a downstream-side cam 33 positioned on the downstream side (on a side in the direction indicated by the arrow F). The center-side cam 35 is fitted in a space defined between the upstream-side cam 32 and the downstream-side cam 33 in a state where the clutch inner 12 and the clutch center 13 are assembled to each other (see FIG. 9 and FIG. 10). By making the center-side cam 35 engage with the inner side cam 31, i.e., the center-side cam 35 may be fitted in the space defined between the upstream-side cam 32 and the downstream-side cam 33 in the clutch rotational direction, the power transmission is performed between the clutch inner 12 and the clutch center 13. Further, by a relative rotational torque generated between the clutch inner 12 and the clutch center 13 at the time of performing the power transmission, the clutch center 13 is moved to the clutch inner 12 in the axial direction so that a clamping force of the pressure plate 15 for clamping the clutch plate group 14a is changed thus changing a clutch capacity.

A downstream-side end surface of the upstream-side cam 32 is formed as a first inclined cam surface 31a which is inclined such that the more a projection distance away from the flange portion 12b of the clutch inner 12 is increased, the more upstream side the first inclined cam surface 31a is disposed. An end surface of the downstream-side cam 33 on an upstream side in the clutch rotational direction is formed as a second inclined cam surface 31b which is inclined such that the more a projection distance away from the flange portion 12b of the clutch inner 12 is increased, the more upstream side the second inclined cam surface 31b is disposed. An inclination angle of the first inclined cam surface 31a with respect to the clutch axial direction is larger than an inclination angle of the second inclined cam surface 31b with respect to the clutch axial direction.

Figure 8:
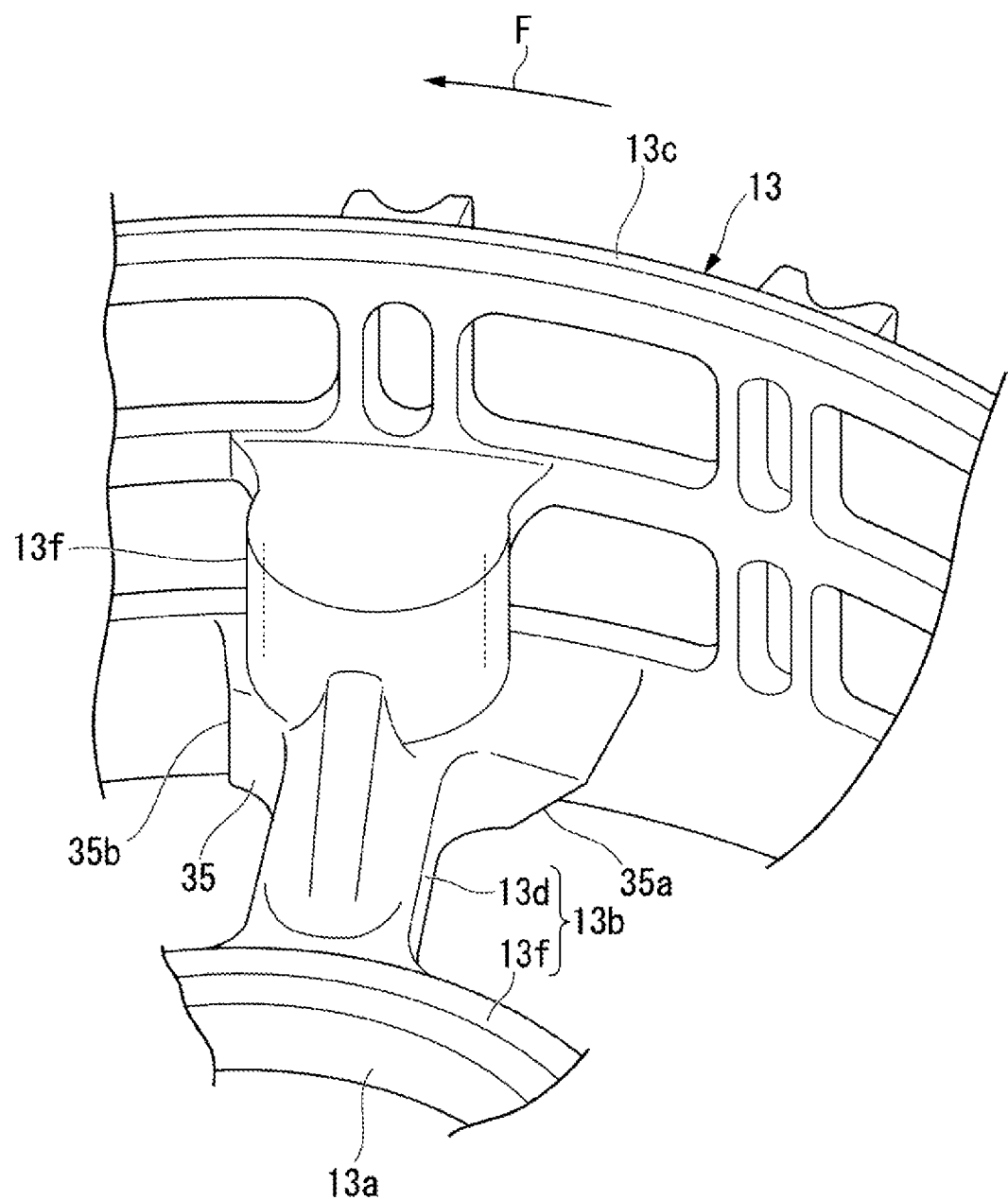
FIG. 8 is an enlarged perspective view of a center-side cam of the clutch center and an area around the center-side cam of the clutch center.

Referring to FIG. 6 and FIG. 8, an end surface of the center-side cam 35 on the upstream side in the clutch rotational direction is formed as a third inclined cam surface 35a which is parallel to the first inclined cam surface 31a of the upstream-side cam 32 of the clutch inner 12. An end surface of the center-side cam 35 on the downstream side in the clutch rotational direction is formed as a fourth inclined cam surface 35b parallel to the second inclined cam surface 31b of the downstream-side cam 33 of the clutch inner 12.

In a state where the clutch inner 12 and the clutch center 13 are assembled to each other, the center-side cam 35 is fitted in the space defined between the upstream-side cam 32 and the downstream-side cam 33 of the inner side cam 31 (see FIG. 9 and FIG. 10) so that the first inclined cam surface 31a and the third inclined cam surface 35a are made to opposedly face each other and, at the same time, the second inclined cam surface 31b and the fourth inclined cam surface 35b are made to opposedly face each other.

Figure 9:
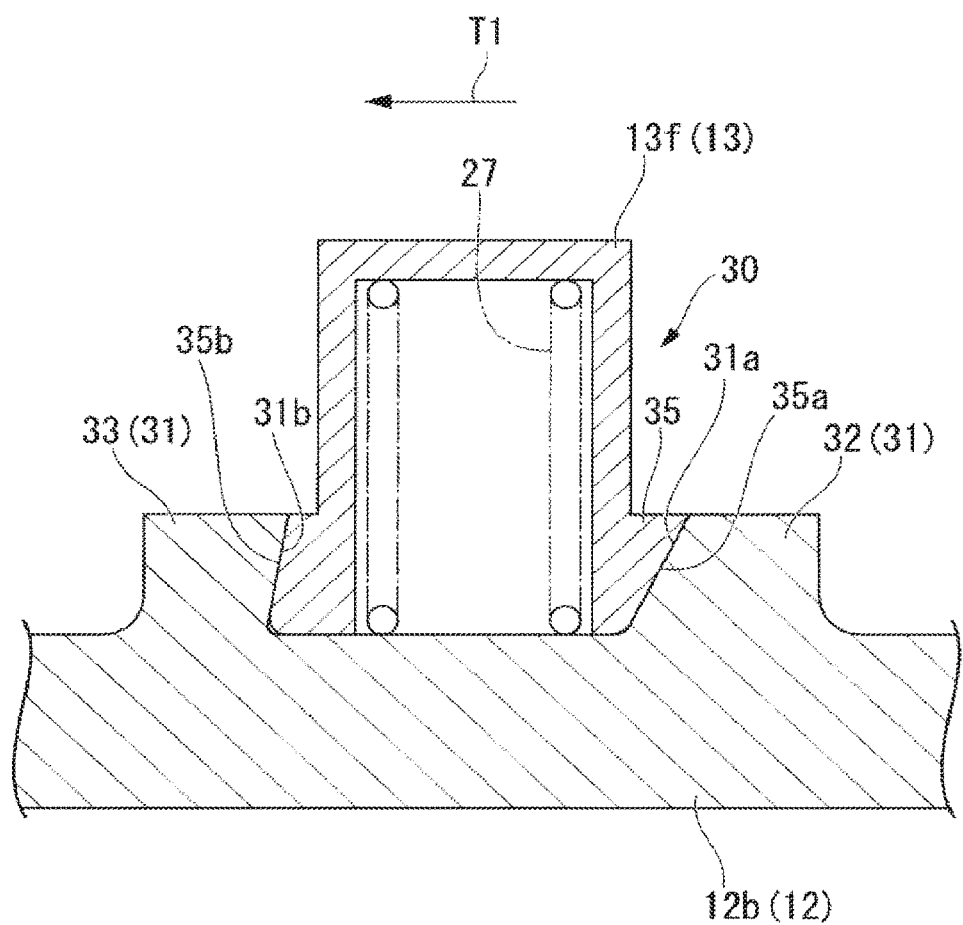
FIG. 9 is a cross-sectional view showing a first manner of operation of a slipper cam mechanism in the clutch of FIG. 1 and taken along a clutch circumferential direction.

Referring to FIG. 9, in the slipper cam mechanism 30, in transmitting a torque to the main shaft 4 side from the crankshaft 2 side, the fourth inclined cam surface 35b of the center-side cam 35 of the clutch center 13 is pushed to the second inclined cam surface 31b of the downstream-side cam 33 of the clutch inner 12 in the clutch rotational direction by a torque (normal rotation torque) indicated by an arrow T1 in the drawing which is applied to the clutch center 13 on the crankshaft 2 side. Due to such an operation, a torque is transmitted to the clutch inner 12 from the clutch center 13 and, at the same time, the clutch center 13 is pulled to the clutch inner 12 in the clutch axial direction along the inclination of the second inclined cam surface 31b and the inclination of the fourth inclined cam surface 35b.

Figure 10:
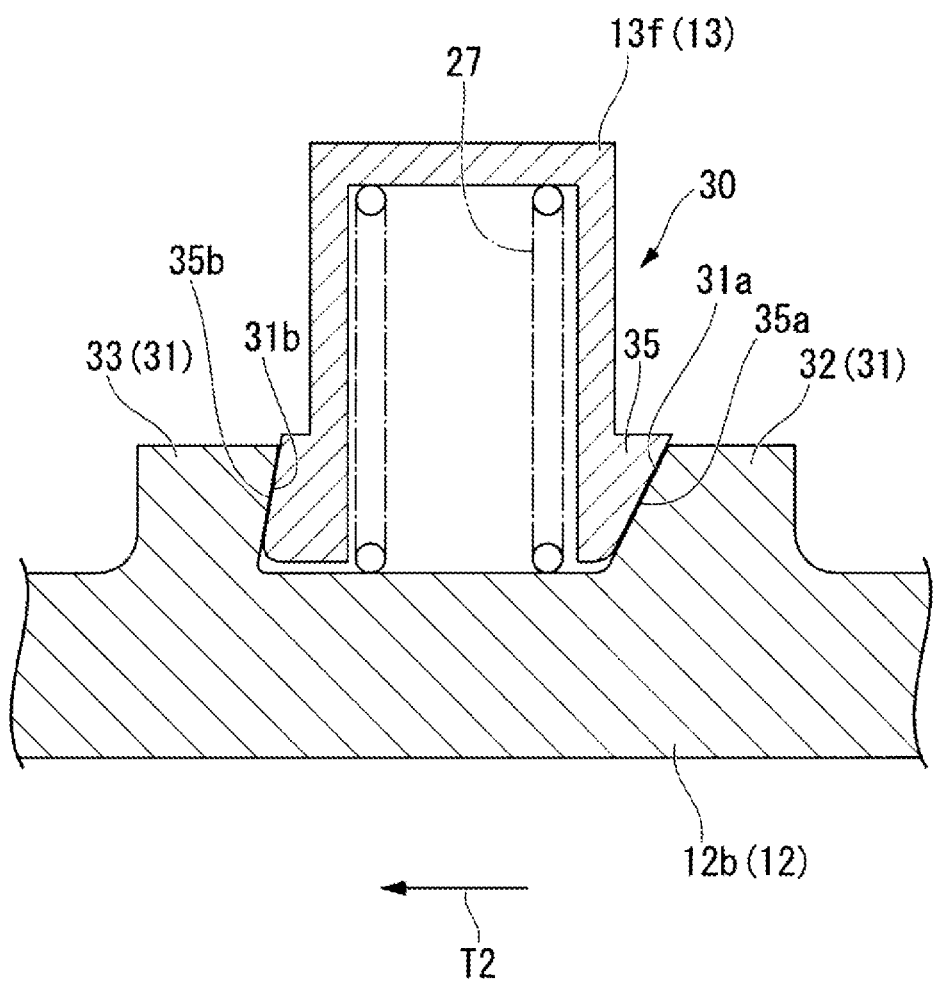
FIG. 10 is a cross-sectional view showing a second manner of operation of a slipper cam mechanism in the clutch of FIG. 1 and taken along a clutch circumferential direction.

Referring to FIG. 10, in the slipper cam mechanism 30, in transmitting a torque to the crankshaft 2 side from the main shaft 4 side, the first inclined cam surface 31a of the upstream-side cam 32 of the inner side cam 31 of the clutch inner 12 is pushed to the third inclined cam surface 35a of the center-side cam 35 of the clutch center 13 in the clutch rotational direction by a torque (back torque) indicated by an arrow T2 in the drawing which is applied to the clutch inner 12 on the main shaft 4 side. Due to such an operation, a torque is transmitted to the clutch center 13 from the clutch inner 12 and, at the same time, the clutch center 13 is pushed out from the clutch inner 12 in the clutch axial direction along the inclination of the first inclined cam surface 31a and the inclination of the third inclined cam surface 35a.

Figure 3:
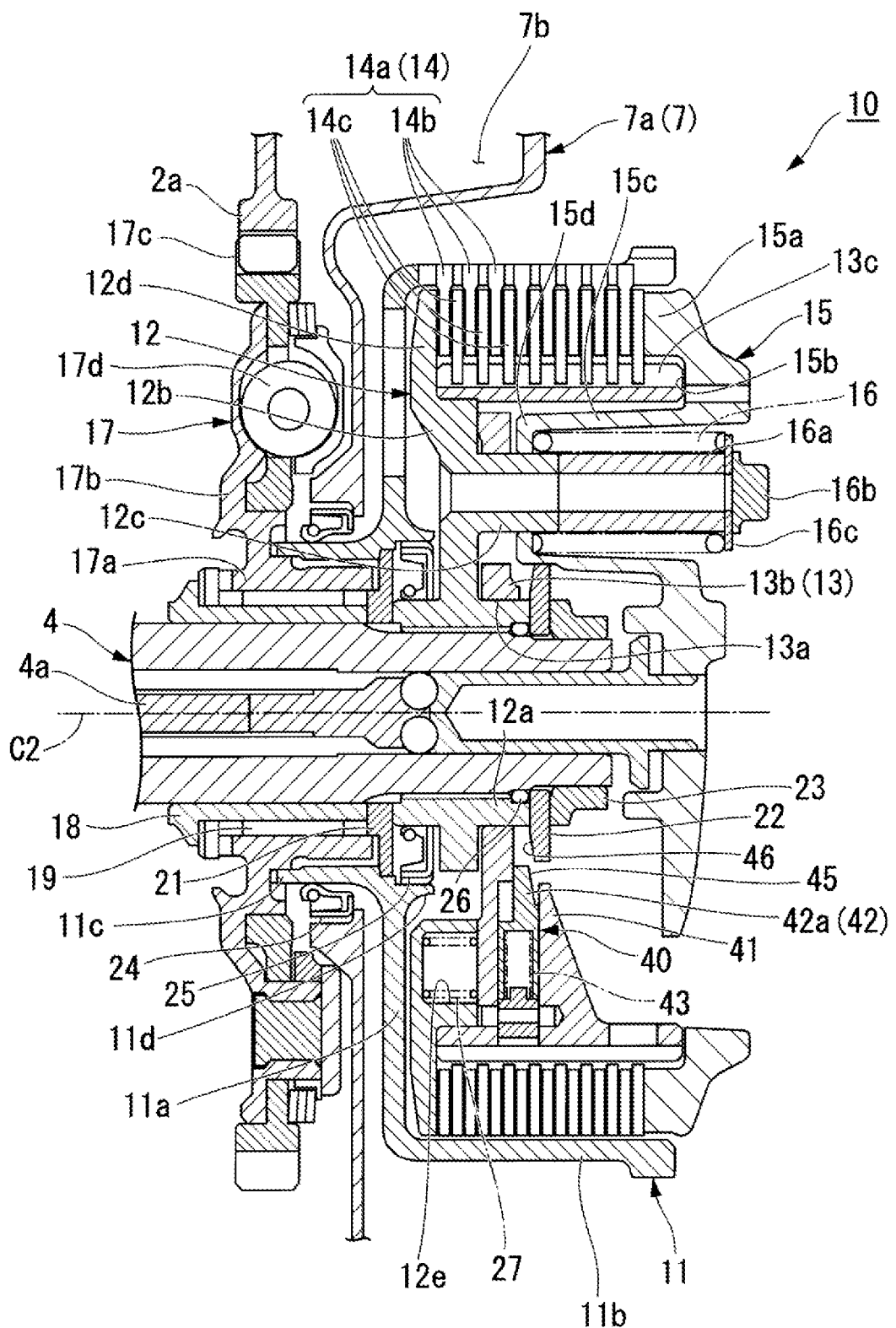
FIG. 3 is a cross-sectional view of the clutch device of FIG. 1 which corresponds to FIG. 2 in a state where the plunger body is retracted.

Referring to FIG. 2 to FIG. 4, the plunger mechanisms 40 are provided to the pair of spoke portions 13d of the clutch center 13 disposed at positions symmetrical to each other in the radial direction. The plunger mechanism 40 restricts the movement of the clutch center 13 in the axial direction by engaging with the movement restricting portion (the washer member 22, for example) until a rotational speed of the clutch center 13 reaches a threshold value. The plunger mechanism 40 is operated by a centrifugal force so as to release the engagement when the rotational speed of the clutch center 13 exceeds the threshold value.

The plunger mechanism 40 includes: a cylinder body 41 which is integrally formed with the spoke portion 13d disposed at the same position; and a plunger body 42 which is held in the inside of the cylinder body 41 in such a manner that the plunger body 42 can stroke. The cylinder body 41 and the plunger body 42 are disposed along the clutch radial direction.

The plunger body 42 is advanceable and retractable between an advanced position where the plunger body 42 is fully advanced to the inner side in the radial direction (see FIG. 2) and a retracted position where the plunger body 42 is fully retracted to the outer side in the radial direction (see FIG. 3). The plunger body 42 is biased toward the inner side in the radial direction, that is, to the advanced position side by the coil spring 43 which is disposed between the plunger body 42 and the bottom portion of the cylinder body 41 in a compressed state. When a centrifugal force is applied to the plunger body 42 due to the rotation of the clutch center 13, the plunger body 42 retracts against a biasing force of the coil spring 43, and is shifted to the retracted position. In the drawing, symbol C4 indicates a center axis which extends along the advancing and retracting direction of the plunger body 42.

Referring to FIG. 2, when the plunger body 42 is positioned at the advanced position, a plunger distal end portion 42a is arranged at a position where the plunger distal end portion 42a overlaps with the washer member 22 as viewed in the clutch axial direction. At this stage of operation, a plunger-side contact surface 45 of the plunger distal end portion 42a is brought into contact with a washer-side contact surface 46 of the washer member 22 in the clutch axial direction so that the movement of the clutch center 13 in the rightward direction is restricted.

Referring to FIG. 3, when the plunger body 42 is positioned at the retracted position, the plunger distal end portion 42a is retracted to a position where the plunger distal end portion 42a does not overlap with the washer member 22 as viewed in the clutch axial direction. At this stage of operation, the plunger-side contact surface 45 of the plunger distal end portion 42a is not in contact with the washer-side contact surface 46 of the washer member 22 in the clutch axial direction so that the movement of the clutch center 13 in the rightward direction is allowed.

The clutch center 13 is axially movable between a first engaging position where the clutch center 13 is moved in the leftward direction with respect to the clutch inner 12 and a second engaging position where the clutch center 13 is moved in the rightward direction with respect to the clutch inner 12. When the clutch center 13 is positioned at the first engaging position, the flange portion 13b of the clutch center 13 is brought into contact with the flange portion 12b of the clutch inner 12 or the like so that the movement of the clutch center 13 in the leftward direction is restricted. At this stage of operation, a right end of the outer peripheral portion 13c of the clutch center 13 is separated from the lift portion 15b of the pressure plate 15.

When the clutch center 13 is positioned at the second engaging position, the right end of the outer peripheral portion 13c is brought into contact with the lift portion 15b of the pressure plate 15 or the like so that the movement of the clutch center 13 in the rightward direction is restricted. At this stage of operation, when the clutch center 13 is pushed out in the rightward direction due to an action of the slipper cam mechanism 30, the pressure plate 15 is moved in the rightward direction so that the clutch device is brought into a half clutch state. In a state where the clutch center 13 is positioned at the second engaging position, when the pressure plate 15 is moved in the rightward direction by performing a clutch disengaging operation, the clutch center 13 is also moved in the rightward direction along with the movement of the pressure plate 15.

Figure 11:
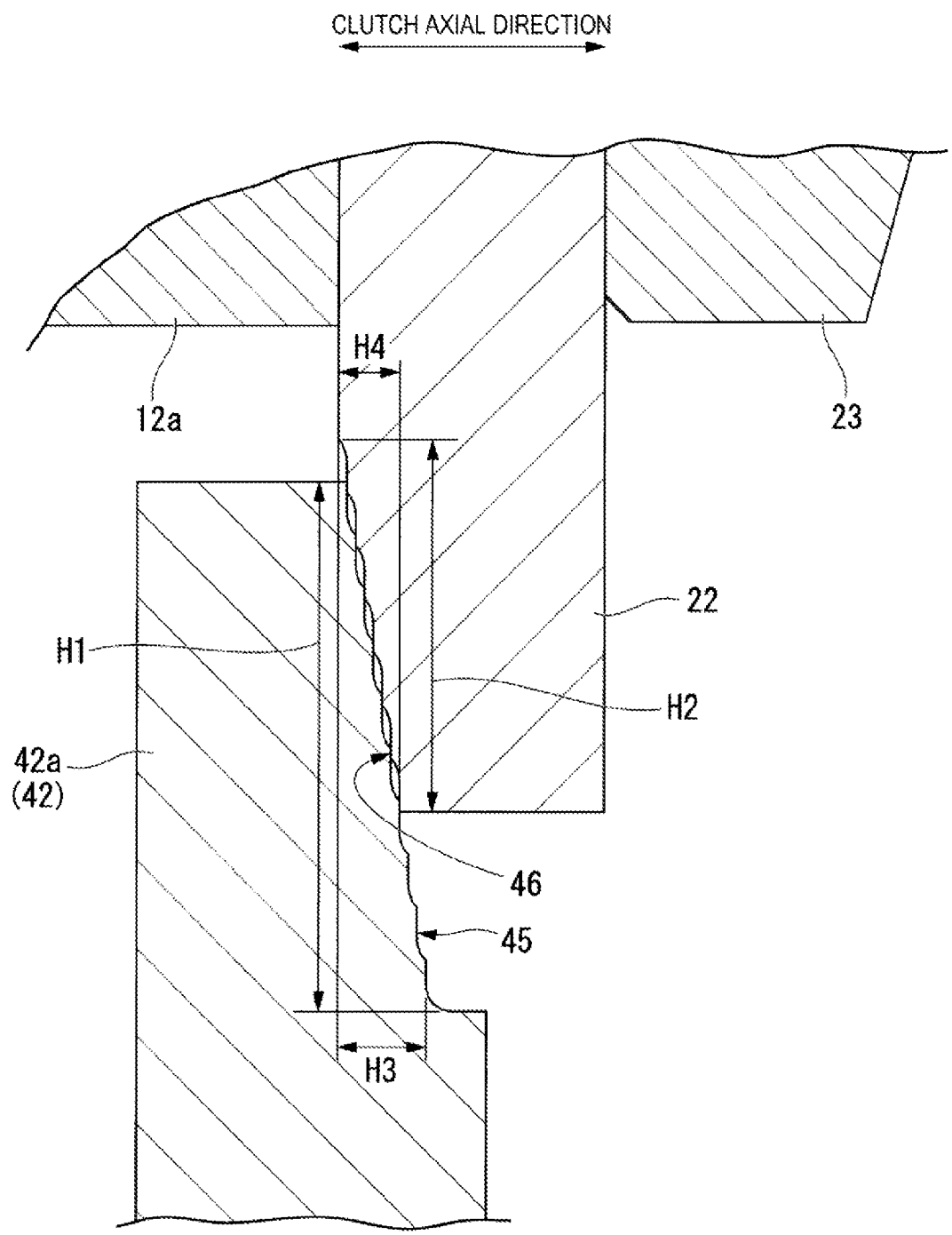
FIG. 11 is an enlarged cross-sectional view in which the plunger body is advanced as in FIG. 2, showing details of a plunger-side contact surface and a washer-side contact surface and areas around the plunger-side contact surface and the washer-side contact surface.
Figure 12:
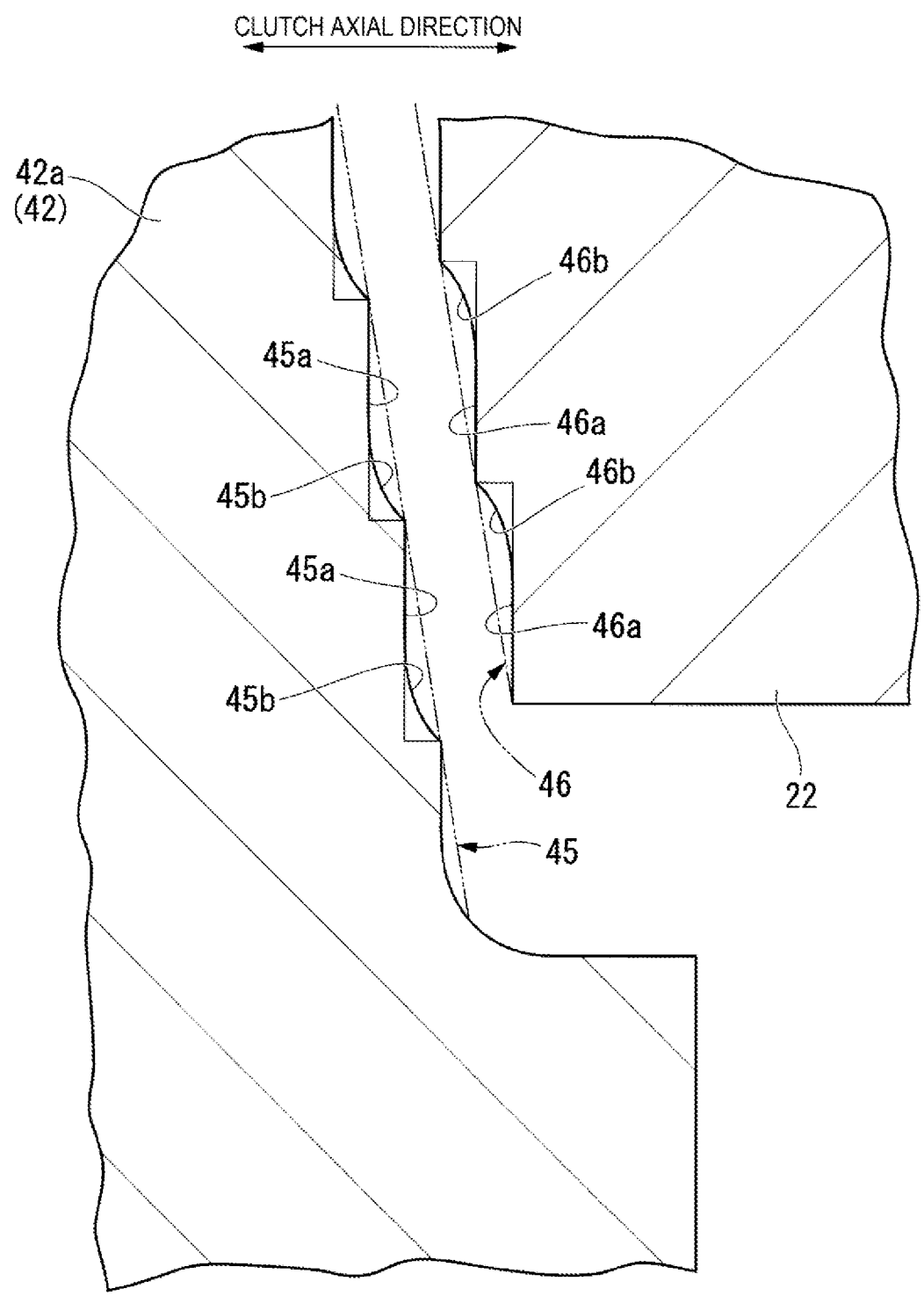
FIG. 12 is a cross-sectional view showing the plunger-side contact surface and the washer-side contact surface and areas around the plunger-side contact surface and the washer-side contact surface shown in FIG. 11 in a further enlarged manner.
Figure 13:
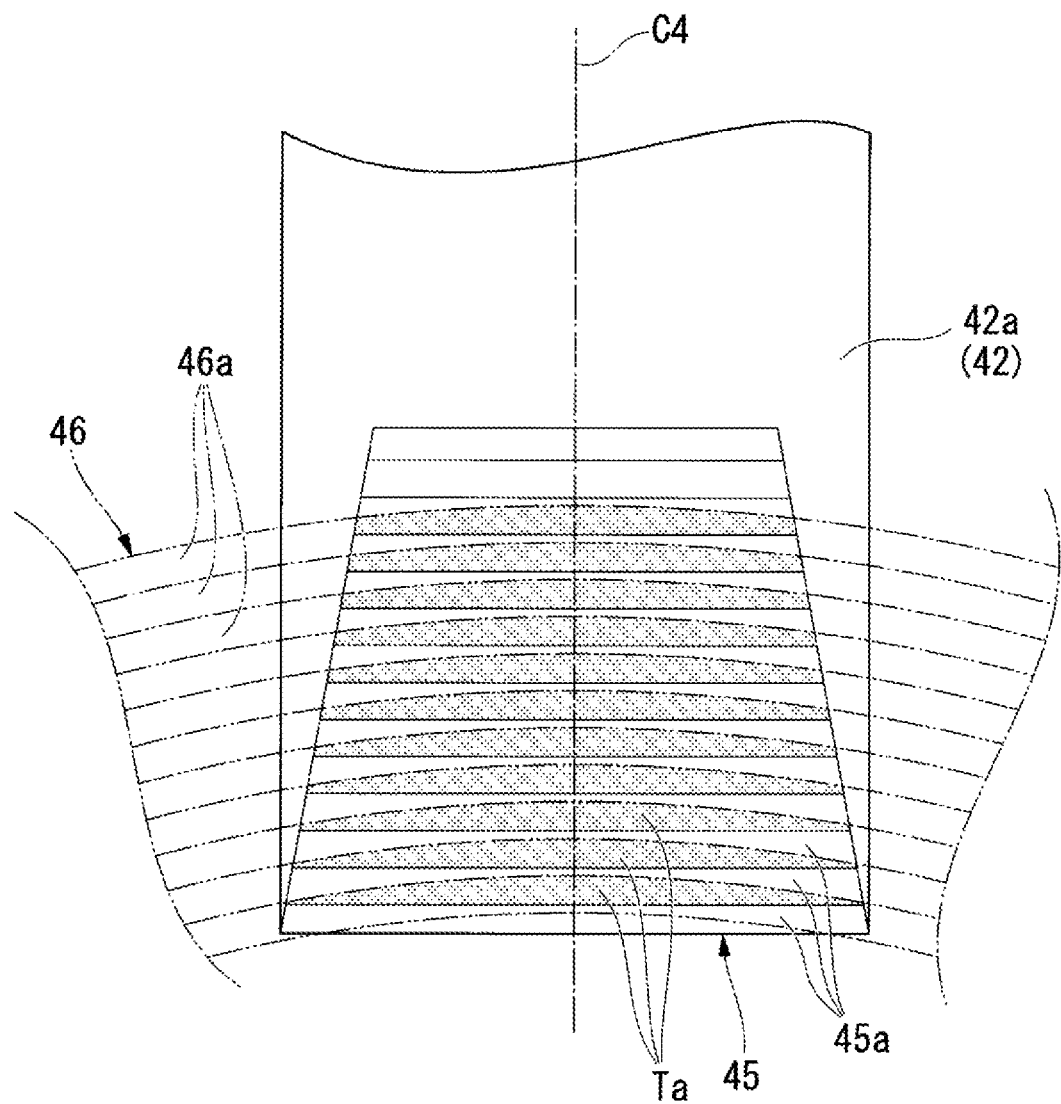
FIG. 13 is a plan view showing the plunger-side contact surface and the washer-side contact surface and the areas around the plunger-side contact surface and the washer-side contact surface as viewed in a clutch axial direction.

Referring to FIGS. 11-13, a tapered plunger-side contact surface 45 is formed on the right side of the plunger distal end portion 42a. The plunger-side contact surface 45 is inclined such that the closer to the plunger distal end side the plunger-side contact surface 45 is disposed with respect to an axially orthogonal plane which is orthogonal to the clutch axis (C2), the farther away from the axial center of the washer member 22 the plunger-side contact surface 45 is positioned. Although the plunger-side contact surface 45 is formed into an inclined surface shape as a whole, in detail, the inclined plunger-side contact surface 45 is formed by a continuous series of stepped shapes which correspond to straight-line shaped streaks orthogonal to the plunger axis (C4) and the clutch axis (C2).

Referring also to FIG. 12, a plurality of stepped surfaces 45a which are parallel to an axially orthogonal plane orthogonal to the clutch axis are formed on the plunger-side contact surface 45, and a plurality of recessed fillet surfaces 45b which are raised from the stepped surfaces 45a, respectively, and are formed in valley portions out of crest portions and the valley portions which are formed into a stepped shape.

Referring to FIG. 11 and FIG. 13, a tapered washer-side contact surface 46 is formed on the left side of the washer member 22. The washer-side contact surface 46 is inclined such that the closer to the outer peripheral side the washer-side contact surface 46 is disposed with respect to an axially orthogonal plane which is orthogonal to a clutch axis, the farther away from the axial center of the plunger body 42 the washer-side contact surface 46 is positioned. Again, although the washer-side contact surface 46 is formed into an inclined surface shape as a whole, in detail, the washer-side contact surface 46 is formed by a continuous series of stepped shapes which correspond to arcuate streaks which extend in the clutch circumferential direction.

Referring to FIG. 12, a plurality of stepped surfaces 46a which are parallel to the axially orthogonal plane orthogonal to the clutch axis are formed on the washer-side contact surface 46, and a plurality of recessed fillet surfaces 46b are raised from the axially orthogonal planes, respectively, and are formed in valley portions out of crest portions and the valley portions formed into a stepped shape.

A height and a depth of each step in a stepped shape of the plunger-side contact surface 45 and a height and a depth of each step in a stepped shape of the washer-side contact surface 46 are set equal. The streaks formed on the plunger-side contact surface 45 and the streaks formed on the washer-side contact surface 46 have the uniform steps and hence, even when a rotational speed of the clutch center 13 exceeds a threshold value so that the plunger body 42 is moved, the engine 1 can be started in a stable manner.

A forming width H1 of the plunger-side contact surface 45 in the plunger axial direction (clutch radial direction) is set larger than a forming width H2 of the washer-side contact surface 46 in the clutch radial direction. A plurality of regions Ta indicated by dots in FIG. 13 indicate regions where the respective stepped surfaces 45a, 46a of both contact surfaces 45, 46 are brought into contact with each other in the clutch axial direction.

A forming width H3 of the plunger-side contact surface 45 in the clutch axial direction is set larger than a forming width H4 of the washer-side contact surface 46 in the clutch axial direction. In this manner, the forming width of the plunger-side contact surface 45 in the clutch axial direction is set larger and hence, even when a position of the plunger body 42 is changed in the clutch axial direction due to wear of the friction disc (the clutch disc 14b and the clutch plate 14c), a contact state between the plunger-side contact surface 45 and the washer-side contact surface 46 is maintained so that the engine 1 can be started in a stable manner.

Next, the manner of operation of the clutch device 10 is explained.

Firstly, when the engine 1 is stopped, the plunger body 42 advances in the clutch center 13 so that the plunger distal end portion 42a is inserted into the space defined between the annular portion 13e and the washer member 22 in a wedge-like manner. By inserting the plunger distal end portion 42a into the space, the movement of the clutch center 13 in the rightward direction (to the pressure plate 15 side) is restricted and, at the same time, the clutch center 13 is shifted in the leftward direction (to the clutch inner 12 side) against a biasing force of the sub-springs 27 so that a left side surface of the flange portion 13b is brought into contact with a right side surface of the flange portion 12b of the clutch inner 12. At this point, the right end of the outer peripheral portion 13c of the clutch center 13 is separated from the lift portion 15b of the pusher plate 15 in the leftward direction so that all spring load of the clutch springs 16 is used for clamping the clutch plate group 14a.

Next, after the engine 1 is started, the plunger body 42 retracts from the clutch center 13 against a biasing force by a centrifugal force so that the plunger distal end portion 42a is pulled out from the space defined between the annular portion 13e and the washer member 22. By pulling out the plunger distal end portion 42a from the space, the clutch center 13 moves in the rightward direction by an amount that the clutch center 13 moves along the inclination of the plunger-side contact surface 45 and the inclination of the washer-side contact surface 46. For example, the plunger body 42 can be moved to the retracted position at a rotational speed of the engine 1 corresponding to idling. After the engine 1 is started, the clutch center 13 can move in the rightward direction regardless of the inclination of the plunger-side contact surface 45 and the inclination of the washer-side contact surface 46.

When the clutch center 13 is moved in the rightward direction, the lift portion 15b of the pressure plate 15 is brought into contact with a right end of the outer peripheral portion 13c. When spring loads of the sub-springs 27 are inputted into the pressure plate 15 at this point, there is no possibility that the pressure plate 15 is moved in the rightward direction only by the spring loads of the sub-springs 27. However, a load obtained by subtracting the spring loads of the sub-springs 27 from the spring loads of the clutch springs 16 is used for clamping the clutch plate group 14a by the pressure plate 15. At this stage of operation, a force for the disengaging operation of the clutch device 10 (a force for moving the pressure plate 15 in the rightward direction) is reduced compared to a force for the clutch disengaging operation at the time of stopping the engine 1. The movement of the clutch center 13 in the rightward direction when the plunger body 42 retracts is restricted, for example, by contact of the clutch center 13 with the washer member 22 at positions where the plunger body 42 is not provided, or the like.

During the operation of the engine 1, when a torque generated on the crankshaft 2 side is transmitted to the wheel side, a normal rotational torque is inputted into the clutch outer 11. At this stage of operation, a relative rotational torque (normal rotational torque) indicated by an arrow T1 in FIG. 9 with respect to the clutch inner 12 is applied to the clutch center 13. Due to such a torque, the fourth inclined cam surface 35b of the clutch center 13 is pushed to the second inclined cam surface 31b of the clutch inner 12 in the clutch rotational direction so that the clutch center 13 is pulled to the clutch inner 12 in the leftward direction. With such a configuration, the clutch center 13 returns to the first engaging position where the clutch center 13 is fully moved in the leftward direction against biasing forces of the sub-springs 27 so that all spring loads of the clutch springs 16 are used for clamping the clutch plate group 14a. That is, a normal rotational torque is transmitted to the clutch inner 12 from the clutch outer 11 in a state where a clutch capacity is set to a maximum value.

On the other hand, when a torque generated on the wheel side is transmitted to the crankshaft 2 side at the time of performing engine braking or the like, a relative rotational torque (back torque) indicated by an arrow T2 in FIG. 10 is applied to the clutch inner 12. Due to such a torque, the first inclined cam surface 31a of the clutch inner 12 is pushed to the third inclined cam surface 35a of the clutch center 13 in the clutch rotational direction so that the clutch center 13 is pushed out in the rightward direction. Due to such an operation, the clutch center 13 is moved in the rightward direction so that the clutch center 13 is moved to the second engaging position thereof. Further, the clutch center 13 pushes the pressure plate 15 in the rightward direction thus attenuating a clamping force of the pressure plate 15 for clamping the clutch plate group 14a. That is, by lowering a clutch capacity, a half clutch state is brought about thus suppressing the transmission of an excessive amount of back torque.

When the engine 1 is started by push starting or the like, a back torque is inputted into the clutch inner 12. However, when the engine 1 is stopped, the plunger body 42 is at the advanced position relative to the clutch center 13. The plunger distal end portion 42a engages with the washer member 22 in the axial direction so that the movement of the clutch center 13 in the rightward direction is restricted. Accordingly, even when a back torque is inputted into the clutch inner 12 at the time of starting the engine 1 by push starting, there is no possibility that a back torque is released by lowering a clutch capacity so that the engine 1 can be favorably cranked.

At this stage of operation, both contact surfaces 45, 46 of the plunger body 42 and the washer member 22 have stepped shapes which conform to each other. When stepped surfaces 45a, 46a which are parallel to the axially orthogonal plane are brought into contact with each other, a slip along the inclination of the plunger-side contact surface 45 and the inclination of the washer-side contact surface 46 is suppressed so that the movement of the clutch inner 12 in the axial direction can be favorably restricted.

Further, a stepped shape of the plunger-side contact surface 45 and a stepped shape of the washer-side contact surface 46 both include the straight stepped surfaces 45a, 46a and arcuate shaped fillet surfaces 45b, 46b. Accordingly, when a contact stage between both contact surfaces 45, 46 is changed at the time of advancing of the plunger body 42, the stepped shapes of both contact surfaces 45, 46 are brought into a point contact at the transition points between adjacent steps of each of the surfaces 45, 46. When the stepped shapes of both contact surfaces 45, 46 are parallel to each other, i.e., at 45a, 46a, the stepped shapes of both contact surfaces 45, 46 are brought into a line contact. By bringing the stepped shapes of both contact surfaces 45, 46 into a point contact, a slide resistance between both contact surfaces 45, 46 can be suppressed. Further, by forming fillet surfaces 45b, 46b on valley portions of the stepped shapes of both contact surfaces 45, 46, both contact surfaces 45, 46 can smoothly slide relative to each other.

In this manner, the movement of the clutch inner 12 in the axial direction can be favorably restricted while allowing the smooth advancing and retracting of the plunger body 42.

As has been explained above, the clutch device 10 according to the present exemplary embodiment includes the slipper cam mechanism 30 which releases a back torque by moving the clutch center 13 in the axial direction, and the plunger mechanisms 40 are provided to the clutch centers 13 and are configured to engage with the movement restricting portion (washer member 22) until a rotational speed of the clutch centers 13 reaches a threshold value thus restricting the movement of the clutch centers 13 in the axial direction. Further, the plunger mechanism 40 is configured to be operated by a centrifugal force when the rotational speed of the clutch centers 13 exceeds the threshold value thus disengaging the engagement between the plunger mechanism and the movement restricting portion.

With such a configuration, even when the engine 1 is started by driving a wheel side by push starting or by an external engine starter or the like in a state where the clutch device 10 is equipped with a back torque limiter formed of the slipper cam mechanism 30, the reduction of a back torque due to the slipper cam mechanism 30 is restricted and hence, the engine 1 can be reliably started in a stable manner.

In the clutch device 10, the plunger mechanism 40 includes the plunger body 42 which is advanceable and retractable between the advanced position thereof where the plunger body 42 overlaps with the washer member 22 as viewed in the axial direction and the retracted position thereof where the plunger body 42 does not overlap with the washer member 22 as viewed in the axial direction, Further, the plunger body 42 is configured to be brought into contact with the washer member 22 in the axial direction in a state where the plunger body 42 is at an advanced position side thus restricting the movement of the clutch center 13 in the axial direction. With such a configuration, the movement of the clutch center 13 can be easily restricted by making use of the washer member 22 associated with the lock nut 23 of the clutch inner 12 as the engaging portion (movement restricting portion) of the plunger mechanism 40.

In the clutch device 10, the clutch center 13 is movable in the axial direction between the first engaging position thereof where the clutch center 13 is separated from the pressure plate 15 and is brought into contact with the clutch inner 12 and the second engaging position thereof where the clutch center 13 is separated from the clutch inner 12 and is brought into contact with the pressure plate 15 thus being capable of moving the pressure plate 15 toward a side opposite to the pressure receiving flange 12d, the sub-spring 27 is provided between the clutch inner 12 and the clutch center 13, the sub-spring 27 has a smaller spring load than the clutch spring 16 and biases the clutch center 13 toward the second engaging position and hence to the clutch inner 12, and the sub-spring 27 is arranged at a position where the sub-spring 27 overlaps with the plunger body 42 as viewed in an axial direction.

With such a configuration, spring loads of the clutch springs 16 which bias the pressure plate 15 in a direction toward the pressure receiving flange 12d side, that is, in the clutch engaging direction, and spring loads of the sub-springs 27 which bias the pressure plate 15 in a direction toward a side opposite to the pressure receiving flange 12d, that is, in the clutch disengaging direction, are inputted to the pressure plate 15. Hence, the pressure plate 15 is biased in the clutch engaging direction with a differential load between the spring loads of both the sub-springs and the clutch springs. Accordingly, when the pressure plate 15 is moved in the clutch disengaging direction by a clutch operator, the pressure plate 15 can be moved with an operating force corresponding to a spring load which is the differential load smaller than a spring load of the clutch springs 16 and hence, a clutch disengaging operation can be performed smoothly. Further, the sub-springs 27 are arranged at the position where the sub-springs 27 overlap with the plunger body 42 as viewed in an axial direction and hence, the plunger body 42 and the washer member 22 can be maintained in a favorable contact state by also making use of the spring loads of the sub-springs 27.

In the clutch device 10, the washer member 22 has the washer-side contact surface 46 which is inclined such that the closer to outer peripheral side the washer-side contact surface 46 is disposed with respect to an axially orthogonal plane, the farther away from the axial center of the plunger body 42 the washer-side contact surface 46 is positioned, and the plunger body 42 has the plunger-side contact surface 45 which is inclined so as to conform to the washer-side contact surface 46.

With such a configuration, the plunger body 42 can be easily inserted at the position where the plunger body 42 engages with the washer member 22, thus facilitating the restriction of the movement of the clutch center 13 in the axial direction. At the same time, when the plunger body 42 retracts, the clutch center 13 can be gradually moved in the axial direction along the inclinations of both contact surfaces 45, 46.

In the clutch device 10, the washer-side contact surface 46 and the plunger-side contact surface 45 are respectively formed in stepped shapes which conform to each other. With such a configuration, compared to a case where flat smooth inclined surfaces are brought into contact with each other, the axially orthogonal planes can be made to partially abut each other and hence, the movement of the clutch center 13 in the axial direction can be favorably restricted by suppressing a slip between both contact surfaces 45, 46.

In the clutch device 10, the washer-side contact surface 46 and the plunger-side contact surface 45 respectively have the curved surface portions (fillet surfaces 46b, 45b) on at least one of the crest portions and the valley portions which form a stepped shape respectively. With such a configuration, even when the plunger body 42 advances or retracts in a state where the washer-side contact surface 46 and the plunger-side contact surface 45 are brought into contact with each other, the plunger body 42 can smoothly advance or retract following a centrifugal force due to the curved surface portions (fillet surfaces 46b, 45b).

In the clutch device 10, the formed width H1 of the plunger-side contact surface 45 in the advanceable and retractable direction is set larger than the formed width H2 of the washer-side contact surface 46 in the radial direction. With such a configuration, the clutch device can be made compact compared to the case where an advancing or retracting stroke of the plunger body 42 in a state where the washer-side contact surface 46 and the plunger-side contact surface 45 are brought into contact with each other is made large, a range where the clutch center 13 is gradually moved in the axial direction is widened, and a diameter of the whole washer is set large thus increasing a formed width of the washer-side contact surface 46.

In the clutch device 10, the washer-side contact surface 46 is formed of arcuate streaks extending along the circumferential direction of the washer member 22, and the plunger-side contact surface 45 is formed of straight-line shaped streaks orthogonal to the axial direction of the plunger body 42. With such a configuration, work for forming the washer-side contact surface 46 and the plunger-side contact surface 45 into a stepped shapes can be performed easily. Also, in the case where the stepped portion of the straight line streak on the plunger-side contact surface 45 engages with or disengages from the stepped portion of the arcuate streak on the washer-side contact surface 46, the arcuate streak on the plunger-side contact surface 45 engages with or disengages from the arcuate streak on the washer-side contact surface 46 while being partially brought into contact with the arcuate streak on the washer-side contact surface 46 and hence, the plunger body 42 can smoothly advance or retract.

The invention is not limited to the above-mentioned exemplary embodiment. For example, a movement restricting mechanism different from the plunger mechanism 40 may be provided, and a movement restricting portion different from the washer member 22 may be provided. The manner of disengaging the friction engagement of the clutch plates 14 is not limited to a manner in which the friction engagement of the clutch plate 14 is disengaged by means of the push rod 4a or the like inserted into the main shaft 4. For example, the friction engagement of the clutch plate 14 may be disengaged by means of a cam mechanism or the like formed on the crankcase cover 7a. The invention is applicable not only to a dry clutch, but also to a wet clutch. The fillet surfaces may be formed on only one of both contact surfaces 45, 46, or round chamfered curved surface portions may be formed on crest portions of a stepped shape of both contact surfaces 45, 46.

The configuration in the described embodiment merely constitutes the present example of the invention, and various modifications are conceivable to persons skill in the art without departing from the gist of the invention such as a replacement of a constitutional element in the exemplary embodiment with an equivalent known constitutional element. Such modifications are intended to fall within the technical scope of the appended claims.

DESCRIPTION OF REFERENCE NUMERALS AND SIGNS

1: engine
4: main shaft (power transmission shaft)
10: clutch device
11: clutch outer (first clutch member)
12: clutch inner (second clutch member)
12d: pressure receiving flange (pressure receiving plate)
13: clutch center (third clutch member)
14a: clutch plate group (assembled body)
14b: clutch disc (first friction plate)
14c: clutch plate (second friction plate)
15: pressurizing plate (pressure plate)
16: clutch spring
22: washer member (movement restricting portion)
23: lock nut
27: sub-spring
30: slipper cam mechanism
40: plunger mechanism (movement restricting mechanism)
42: plunger body (plunger)
45: plunger-side contact surface
45b: fillet surface (curved surface portion) on plunger-side contact surface
H1: formed width of plunger-side contact surface
46: washer-side contact surface
46b: fillet surface (curved surface portion) on washer-side contact surface
H2: formed width of washer-side contact surface

We claim:

1. A clutch device comprising:
a first clutch member;
a second clutch member;
a third clutch member supported on the second clutch member in an axially movable and relatively rotatable manner;
a first friction plate supported on the first clutch member in an axially movable and integrally rotatable manner;
a second friction plate supported on the third clutch member in an axially movable and integrally rotatable manner, such that the second friction plate overlaps with the first friction plate;
a pressure receiving plate mounted on the second clutch member in a state where the pressure receiving plate opposedly faces one side of an assembled body formed of the first friction plate and the second friction plate in a clutch axial direction;
a pressurizing plate provided in a state where the pressurizing plate faces an opposite side of the assembled body in the clutch axial direction and is movable toward the pressure receiving plate in the clutch axial direction;
a clutch spring which biases the pressurizing plate to a pressure receiving plate side;
a slipper cam mechanism provided between the second clutch member and the third clutch member, and configured such that in a state where a back torque is applied to the third clutch member from the second clutch member, the slipper cam mechanism moves the third clutch member along with the pressurizing plate in the clutch axial direction to reduce the back torque transmitted to the first clutch member; and
a movement restricting mechanism provided to the third clutch member which selectively limits movement of the third clutch member in the clutch axial direction, wherein the movement restricting mechanism is moved between movement restricting and movement non-restricting positions thereof by a centrifugal force generated by rotation of the third clutch member such that the movement restricting mechanism restricts axial movement of the third clutch member until a rotational speed of the third clutch member reaches a threshold value, but does not restrict the axial movement of the third clutch member when the rotational speed of the third clutch member exceeds the threshold value, and further including
a power transmission shaft supporting the clutch device;
a lock nut fixing the second clutch member to the power transmission shaft; and
a washer member which forms the movement restricting portion arranged between the lock nut and the second clutch member,
wherein the movement restricting mechanism includes a plunger which is advanceable and retractable between the movement restricting position of the movement restricting mechanism where the plunger overlaps with the washer member as viewed in an axial direction, and the movement non-restricting position of the movement restricting mechanism where the plunger does not overlap with the washer member as viewed in an axial direction, and the plunger contacts the washer member in the clutch axial direction when the movement restricting mechanism is in the movement restricting position thereof, thus restricting the movement of the third clutch member in the clutch axial direction,
wherein the washer member has a washer-side contact surface which is inclined such that the closer to an outer peripheral side the washer-side contact surface is disposed with respect to an axially orthogonal plane, the farther away from an axial center of the plunger the washer-side contact surface is positioned, and the plunger has a plunger-side contact surface which is inclined so as to conform to the washer-side contact surface, and
wherein the washer-side contact surface and the plunger-side contact surface are each formed into a stepped shape.

2. The clutch device according to claim 1, wherein the movement restricting mechanism engages with a movement restricting portion when restricting the axial movement of the third clutch member, and does not engage with the movement restricting portion when not restricting the axial movement of the third clutch member.

3. The clutch device according to claim 1, wherein the third clutch member is movable in the clutch axial direction between a first engaging position where the third clutch member is separated from the pressurizing plate and is brought into contact with the second clutch member and a second engaging position where the third clutch member is separated from the second clutch member and is brought into contact with the pressurizing plate for moving the pressurizing plate toward a side opposite to the pressure receiving plate, and the clutch device further comprises a sub-spring provided between the second clutch member and the third clutch member, the sub-spring has a smaller spring load than that of the clutch spring and biases the third clutch member to the second clutch member in a direction toward the second engaging position of the third clutch member, and the sub-spring is arranged at a position where the sub-spring overlaps with the plunger as viewed in the clutch axial direction.

4. The clutch device according to claim 1, wherein the washer-side contact surface and the plunger-side contact surface each have a curved surface portion on at least one of a crest portion and a valley portion which form a stepped shape thereof, respectively.

5. The clutch device according to claim 4, wherein the washer-side contact surface is formed as an arcuate streak extending along a circumferential direction of the washer member, and the plunger-side contact surface is formed as a straight-line shaped streak orthogonal to an axial direction of the plunger.

6. The clutch device according to claim 1, wherein a formed width of the plunger-side contact surface in an advanceable and retractable direction of the plunger is set larger than a formed width of the washer-side contact surface in a clutch radial direction.

7. The clutch device according to claim 6, wherein the washer-side contact surface is formed as an arcuate streak extending along a circumferential direction of the washer member, and the plunger-side contact surface is formed as a straight-line shaped streak orthogonal to an axial direction of the plunger.

8. The clutch device according to claim 1, wherein the washer-side contact surface is formed as an arcuate streak extending along a circumferential direction of the washer member, and the plunger-side contact surface is formed as a straight-line shaped streak orthogonal to an axial direction of the plunger.

* * * * *